United States Patent
Tobin et al.

(10) Patent No.: US 12,319,001 B2
(45) Date of Patent: Jun. 3, 2025

(54) METHODS OF ADDITIVELY MANUFACTURING TOWER STRUCTURES WITH COILED POLYMER REINFORCEMENT MEMBERS

(71) Applicant: General Electric Company, Schenectady, NY (US)

(72) Inventors: James Robert Tobin, Greenville, SC (US); Xiaopeng Li, Niskayuna, NY (US); Ryan Eric Vogel, Greer, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 117 days.

(21) Appl. No.: 17/988,234

(22) Filed: Nov. 16, 2022

(65) Prior Publication Data

US 2024/0157644 A1    May 16, 2024

(51) Int. Cl.
*B29C 64/321* (2017.01)
*B29C 64/165* (2017.01)
(Continued)

(52) U.S. Cl.
CPC .......... *B29C 64/321* (2017.08); *B29C 64/165* (2017.08); *B33Y 10/00* (2014.12);
(Continued)

(58) Field of Classification Search
CPC ..... B29C 64/321; B29C 64/165; B33Y 10/00; B33Y 30/00; B33Y 40/00; B29L 2031/766; B28B 1/00
See application file for complete search history.

(56) References Cited

U.S. PATENT DOCUMENTS 3,516,129 A    6/1970 Yoder
4,695,340 A    9/1987 Matuska
(Continued)

FOREIGN PATENT DOCUMENTS

CN    102853741 A    1/2013
CN    108191360 A    6/2018
(Continued)

OTHER PUBLICATIONS

KR20180111035 English translation prepared Aug. 16, 2024 (Year: 2024).*
(Continued)

*Primary Examiner* — Christopher M Rodd
*Assistant Examiner* — Shibin Liang
(74) *Attorney, Agent, or Firm* — Dority & Manning, P.A.

(57) ABSTRACT

A method of manufacturing a tower structure includes printing and depositing, via a printhead assembly of an additive printing system, one or more printed layers of a wall of the tower structure. The method also includes unwinding at least one continuous roll of a reinforcement material to form at least one continuous reinforcement ring member layer, the reinforcement material comprising a pultruded polymer material. Further, the method includes placing the at least one continuous reinforcement ring member layer atop the one or more printed layers of the wall of the tower structure. Moreover, the method includes printing and depositing, via the printhead assembly of the additive printing system, one or more additional printed layers of the wall of the tower structure atop the at least one continuous reinforcement ring member layer.

16 Claims, 19 Drawing Sheets

(51) Int. Cl.
*B33Y 10/00* (2015.01)
*B33Y 30/00* (2015.01)
*B33Y 40/00* (2020.01)
*B29L 31/00* (2006.01)

(52) U.S. Cl.
CPC .............. *B33Y 30/00* (2014.12); *B33Y 40/00* (2014.12); *B29L 2031/766* (2013.01)

(56) References Cited

U.S. PATENT DOCUMENTS

| | | | |
|---|---|---|---|
| 4,927,481 | A | 5/1990 | McGregor |
| 5,064,491 | A | 11/1991 | Huvey |
| 5,683,530 | A | 11/1997 | Fawley et al. |
| 5,876,553 | A | 3/1999 | Kaiser |
| 6,221,295 | B1 | 4/2001 | Kaiser et al. |
| 6,712,153 | B2 | 3/2004 | Turley et al. |
| 8,161,698 | B2 * | 4/2012 | Migliore ............... F03D 13/22 52/649.4 |
| 8,413,396 | B2 | 4/2013 | Oliva et al. |
| 8,673,101 | B2 | 3/2014 | Brandstrom |
| 8,778,479 | B2 | 7/2014 | Bech |
| 8,801,415 | B2 | 8/2014 | Khoshnevis |
| 9,331,534 | B2 | 5/2016 | Yost |
| 9,375,861 | B2 | 6/2016 | Schibsbye |
| 9,388,598 | B2 | 7/2016 | Stiesdal |
| 9,566,742 | B2 | 2/2017 | Keating et al. |
| 10,066,413 | B2 | 9/2018 | Khoshnevis |
| 10,810,734 | B2 | 10/2020 | Salgian et al. |
| 11,021,887 | B2 | 6/2021 | Keller et al. |
| 2010/0257792 | A1 | 10/2010 | Khoshnevis |
| 2010/0308147 | A1 | 12/2010 | Brandstrom |
| 2011/0041733 | A1 | 2/2011 | Bartl et al. |
| 2012/0159785 | A1 | 6/2012 | Pyles et al. |
| 2015/0300036 | A1 | 10/2015 | Khoshnevis |
| 2015/0367375 | A1 | 12/2015 | Page |
| 2017/0016244 | A1 * | 1/2017 | Keller ............... E04G 21/0463 |
| 2017/0129153 | A1 | 5/2017 | Koivuharju |
| 2017/0225445 | A1 | 8/2017 | Gardiner |
| 2017/0305034 | A1 | 10/2017 | Grivetti et al. |
| 2018/0071949 | A1 | 3/2018 | Giles |
| 2018/0093373 | A1 * | 4/2018 | Niederberger ......... B33Y 30/00 |
| 2018/0127980 | A1 | 5/2018 | Fuchsmann et al. |
| 2020/0323047 | A1 | 10/2020 | Sarangi |
| 2021/0308962 | A1 | 10/2021 | Arkhipov et al. |
| 2021/0388616 | A1 | 12/2021 | Li et al. |
| 2022/0032497 | A1 | 2/2022 | Turnquist et al. |
| 2022/0034108 | A1 | 2/2022 | Cooper et al. |
| 2022/0034116 | A1 | 2/2022 | Turnquist et al. |
| 2022/0034303 | A1 | 2/2022 | Turnquist et al. |

FOREIGN PATENT DOCUMENTS

| | | | |
|---|---|---|---|
| CN | 110261915 B | | 2/2021 |
| DE | 10 2013 225049 A1 | | 6/2015 |
| EP | 1711328 B1 | | 3/2013 |
| EP | 2735674 A1 | | 5/2014 |
| EP | 2370246 B1 | | 4/2015 |
| EP | 3091135 A1 | | 11/2016 |
| EP | 3118394 A1 | | 1/2017 |
| EP | 4 008 511 A1 | | 6/2022 |
| GB | 2525400 A | | 10/2015 |
| KR | 20040041243 A | | 5/2004 |
| KR | 101681544 B1 | | 12/2016 |
| KR | 20180111035 | * | 10/2018 ............. B29C 70/52 |
| KR | 20180111035 A | | 10/2018 |
| KR | 101932227 B1 | | 12/2018 |
| WO | WO0179131 A1 | | 10/2001 |
| WO | WO 2021/201840 A1 | | 10/2002 |
| WO | WO2005/070657 A1 | | 8/2005 |
| WO | WO2013/120889 A1 | | 8/2013 |
| WO | WO2016/019434 A1 | | 2/2016 |
| WO | WO2016/055222 A1 | | 4/2016 |
| WO | WO2017/092766 A1 | | 6/2017 |
| WO | WO2019/057267 A1 | | 3/2019 |
| WO | WO 2020/068122 | | 4/2020 |
| WO | WO2020068113 A1 | | 4/2020 |
| WO | WO2020068122 A1 | | 4/2020 |
| WO | WO2020069070 A1 | | 4/2020 |
| WO | WO2021098197 A1 | | 5/2021 |
| WO | WO 2023/059311 A1 | | 4/2023 |

OTHER PUBLICATIONS

Abdollahnejad et al., Comparative Study on the Effects of Recycled Glass-Fiber on Drying Shrinkage Rage and Mechanical Properties of the Self-Compacting Mortar and Fly Ash-Slag Geopolymer Mortar, Journal of Materials in Civil Engineering, vol. 29, No. 8, Aug. 2017. (Abstract Only) https://ascelibrary.org/doi/full/10.1061/%28ASCE%29MT.1943-5533.0001918.

Acorn, Structural Systems, 4 Pages. Retrieved Aug. 3, 2022 from Webpage: https://automated.construction/approach-physical?_sm_vck=sJDv7JG0JN1b1S4F7RJFS37JVVbLPW13Ms26LGNRnDv7JnGFGLrM.

APIS COR, Laying Down Framework and Walls, Apr. 6, 2016. (Weblink Only) https://www.youtube.com/watch?v=ViqzfPW6TFo.

Bank et al., Concepts for Reusing Composite Materials from Decommissioned Wind Turbine Blades in Affordable Housing, Recycling, vol. 3, 2018, 11 Pages. https://www.mdpi.com/2313-4321/3/1/3/pdf.

Bank, Opportunities for Recycling and Reuse of FRP Composites for Construction in a Circular Economy, 2018, 19 Pages. https://static.squarespace.com/static/5b324c409772ae52fecb6698/t/5b742fa48a922ddaec973fdd/1534341041431/Bank+CICE+2018+Keynote+FINAL.pdf.

Bos et al., Experimental Exploration of Metal Cable as Reinforcement in 3D Printed Concrete, MDPI, Journals, Materials, vol. 10, Issue 11, 2017, 1314, 22 Pages. https://doi.org/10.3390/ma10111314.

Casas et al., Fiber Optic Sensors for Bridge Monitoring, Journal of Bridge Engineering, vol. 8, Issue 6, Nov. 2003. https://ascelibrary.org/doi/abs/10.1061/(ASCE)1084-0702(2003)8:6(362).

The Composites Hub, Case Study: GFRP Rebars for Tunnel Lining, Nov. 22, 2016, 2 Pages. Retrieved Aug. 3, 2022 from Webpage: https://www.thecompositeshub-india.com/gfrp-rebar-for-tunnel-lining.

Concrete Pro, Brochure: Laser Projection Systems for Production of Precast Concrete Parts, 8 Pages. Laser projectors for the precast concrete parts industry.

Contour Crafting, Civil Engineering Seminar Topics, Jun. 2016, 14 Pages. University of Southern California-Contour Crafting.

Fernandez et al., 3D FEM Model Development from 3D Optical Measurement Technique Applied to Corroded Steel Bars, Construction and Building Materials, vol. 124, 2016, pp. 519-532. https://www.sciencedirect.com/science/article/abs/pii/S0950061816312338.

FHWA, Chapter 8—Rebar Cages, Drilled Shafts: Construction Procedures by FHWA, PileBuck, Jun. 29, 2016, 11 Pages. http://www.pilebuck.com/drilled-shafts-construction-procedures-fhwa/chapter-8-rebar-cages/.

Fox, Recycling Wind Turbine Blade Composite Material as Aggregate in Concrete, Thesis, Iowa State University, 2016, 57 Pages. https://www.imse.iastate.edu/files/2014/03/Fox~Tyler-Recycling-wind-turbine-blade-composite-material-as-aggregate~in-concrete.pdf.

Frangez et al., Depth-Camera-Based Rebar Detection and Digital Construction for Robotic Concrete Spraying, Construction Robotics, vol. 5, 2021, pp. 191-202.

Gosselin et al., Large-Scale 3D Printing of Ultra-High Performance Concrete—A New Processing Route for Architects and Builders, Materials & Design, vol. 100, Jun. 15, 2016, pp. 102-109.

Gutierrez et al., A Wind Turbine Tower Design Based on the use of Fibre-Reinforced Composites, Institute for the Protection and Security of the Citizen European Laboratory for Structural Assessment (ELSA), EUR 20786 EN, Italy, 2013, 176 Pages. (Split into A, B, C, D) https://op.europa.eu/en/publication-detail/-/publication/fa8fd327-ffcc-407f-8404-424278d71a1f.

(56) References Cited

OTHER PUBLICATIONS

Hack et al., Development of a Robot-Based Multi-Directional Dynamic Fiber Winding Process for Additive Manufacturing Using Shotcrete 3D Printing, MDPI Fibers, 2021, vol. 9, Issue 6, 2021, 17 Pages. https://www.mdpi.com/2079-6439/9/6/39/htm.

Irving, 3D Printed Reinforced Concrete Bridge Opens in the Netherlands, New Atlas, Architecture, Oct. 17, 2017, 8 Pages. https://newatlas.com/3d-printed-concrete-bridge/51796/.

Ji et al., A 3D Printed Ready-Mixed Concrete Power Distribution Substation: Materials and Construction Technology, Materials, vol. 12(9): 1540, 2019, 14 Pages. A 3D Printed Ready-Mixed Concrete Power Distribution Substation: Materials and Construction Technology.

Khoshnevis, Automated Construction by Contour Crafting—Related Robotics and Information Technologies, Journal of Automation and Construction—Special Issue: The Best of ISARC 2002, vol. 13, Issue 1, Jan. 2004, pp. 5-19. Automated Construction by Contour Crafting—Related Robotics and Information Technologies.

Kimm et al., Investigation of Surface Modification and vol. Content of Glass and Carbon Fibres from Fibre Reinforced Polymer Waste for Reinforcing Concrete, Journal of Hazardous Materials, vol. 390, Dec. 2019. (Abstract Only) https://www.sciencedirect.com/science/article/abs/pii/S0304389419317510.

Kloft et al., Reinforcement Strategies for 3D-Concrete-Printing, Civil Engineering Design, vol. 2, Issue 4, Aug. 2020, pp. 131-139. Reinforcement strategies for 3D-concrete-printing.

Mason, Lase Projection Systems Improve Composite Ply Placement, Airtech Large Scale 3D Printing, 7 Pages. Laser Guide Play Assembly.

Mechtcherine et al., 3D-Printed Steel Reinforcement for Digital Concrete Construction—Manufacture, Mechanical Properties and Bond Behaviour, ScienceDirect, Construction and Building Materials, vol. 179, No. 10, Aug. 10, 2018, pp. 125-137.(ABSTRACT Only) https://doi.org/10.1016/j.conbuildmat.2018.05.202.

Mohan et al., Extrusion-Based Concrete 3D Printing from a Material Perspective: A State-of-the-art Review, Cement and Concrete Composites, vol. 115, Jan. 2021.(ABSTRACT Only). Extrusion-based concrete 3D printing from a material perspective: A state-of-the-art review.

Molitch-Hou, 400-Square-Meter Villa 3D Printed Onsite in Just 45 Days, Engineering.com, 3D Printing, Jun. 2016. https://www.engineering.com/story/400-square-meter-villa-3d-printed-onsite-in-just-45-days.

Nematollahi et al., Current Progress of 3D Concrete Printing Technologies, 34$^{th}$ International Symposium on Automation and Robotics in Construction (ISARC 2017), 8 Pages. Current Progress of 3D Concrete Printing Technologies.

Nerella et al., Incorporating Reinforcement into Digital Concrete Construction, Conference: The annual Symposium of the IASS—International Association for Shell and Spatial Structures: Creativity in Structural Design At: MIT, Cambridge, Jul. 2018, 9 Pages. Incorporating reinforcement into digital concrete construction.

Novais et al., Effective Mechanical Reinforcement of Inorganic Polymers Using Glass Fibre Waste, Journal of Cleaner Production, vol. 166, Jul. 31, 2017, pp. 343-349. (Abstract Only) https://www.sciencedirect.com/science/abs/pii/S0959652617316992.

Novais et al., Incorporation of Glass Fibre Fabrics Waste into Geopolymer Matrices: An Eco-Friendly Solution for Off-Cuts Coming from Wind Turbine Blade Production, Construction and Building Materials, vol. 187, Oct. 30, 2018, pp. 876-883. (Abstract Only) https://www.sciencedirect.com/science/abs/pii/s0950061818319445.

Omuro et al., Three-Dimensional Printing of Continuous Carbon Fiber Reinforced Thermoplastics by In-Nozzle Impregnation with Compaction Roller, Materials Science Engineering, 21$^{st}$ International Conference on Composite Materials Xi'an, 2017, 6 Pages. Three-dimensional Printing of Continuous Carbon Fiber Reinforced Thermoplastics by In-nozzle Impregnation With Compaction Roller.

Quigley, A Few Ways to Strengthen 3D Printed Parts, www.3ders.org , 3D Printer and 3D Printing News, Oct. 10, 2014. http://www.3ders.org/articles/20141010-a-few ways-to-strengthen-3d-printed-parts.html.

Saccani et al., Composites Obtained by Recycling Carbon Fibre/Epoxy Composite Wastes in Building Materials, Construction and Building Materials, vol. 204, Apr. 20, 2019, pp. 296-302. (Abstract Only) https://www.sciencedirect.com/science/article/abs/pii/S0950061819302466.

Siemens Gamesa, Sustainability Report 2017, Renewable Energy, 49 Pages. https://www.siemensgamesa.com/en-int/-/media/siemensgamesa/downloads/en/investors-and-shareholders/corporate-governance/general-shareholders-meetings/2018/documentation/is-2017-eng.pdf.

Tang et al., A Review on Fiber Optic Sensors for Rebar Corrosion Monitoring in RC Structures, Construction and Building Materials, vol. 313, Dec. 27, 2021, 125578. https://www.sciencedirect.com/science/article/abs/pii/S0950061821033158 (Abstract Only).

Ueda et al., 3D Compaction Printing of a Continuous Carbon Fiber Reinforced Thermoplastic, Composites Part A: Applied Science and Manufacturing, vol. 137, Oct. 2020. (Abstract Only) 3D compaction printing of a continuous carbon fiber reinforced thermoplastic.

Yazdanbakhsh et al., Mechanical Processing of GFRP Waste into Large-Sized Pieces for Use in Concrete, MDPI Recycling, vol. 3, Issue 8, 2018, 11 Pages. https://pdfs.semanticscholar.org/543d/5172927ee0b6999bd6d415303fa8ba61a186.pdf.

Zareiyan et al., Effects of Interlocking on Interlayer Adhesion and Strength of Structures in 3D Printing of Concrete, Automation in Construction, vol. 83, Nov. 2017, pp. 212-221 https://www.researchgate.net/publication/319162312_Effects_of_interlocking_on_interlayer_adhesion_and_strength_of_structures_in_3D_printing_of_concrete.

Ashwini Sakharkar: GE Hopes to 3D Print Concrete Bases for Extra Tall Wind-Turbine Towers:, Apr. 29, 2022, p. 1-2, www.incentivemind.com/ge-hopes-3d-print-concrete-bases-wind-turbine-towers/24473.

EPO Search Report, Apr. 25, 2024.

\* cited by examiner

METHODS OF ADDITIVELY MANUFACTURING TOWER STRUCTURES WITH COILED POLYMER REINFORCEMENT MEMBERS

FIELD

The present disclosure relates in general to additively manufactured structures, and more particularly to coiled polymer reinforcement members in additively manufactured structures, such as wind turbine towers.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Tower structures, and in particular wind turbine towers, are often constructed of steel tubes, prefabricated concrete sections, or combinations thereof. Further, the steel tubes and/or concrete sections are typically formed off-site, shipped on site, and then arranged together to form the tower. However, such manufacturing methods are limited by transportation regulations that prohibit shipping of tower sections having a diameter greater than about 4 to 5 meters. Thus, certain tower manufacturing methods include forming a plurality of arc segments and securing the segments together on site to form the diameter of the tower, e.g., via bolting and/or welding. Such methods, however, require extensive labor and can be time-consuming.

Accordingly, as tower heights increase, additive manufacturing of the tower structures has become more common. In such methods, the tower structures can be additively printed onsite to any desirable height. In particular, the tower structures may be printed of a concrete material and reinforced with reinforcement members, such as steel rebar, that provide additional structure support to the tower.

However, shipment of conventional steel rings in a complete ring format for reinforcing such concrete tower structures can be problematic due to their large size (e.g., greater than about 4.5 meters or so). Thus, the steel rings are typically shipped in segments that must be assembled on-site.

In view of the foregoing, the art is continually seeking improved methods for manufacturing wind turbine towers.

BRIEF DESCRIPTION

Aspects and advantages of the present disclosure will be set forth in part in the following description, or may be obvious from the description, or may be learned through practice of the present disclosure.

In an aspect, the present disclosure is directed to a method of manufacturing a tower structure. The method includes printing and depositing, via a printhead assembly of an additive printing system, one or more printed layers of a wall of the tower structure. The method also includes unwinding at least one continuous roll of a reinforcement material to form at least one continuous reinforcement ring member layer, the reinforcement material comprising a pultruded polymer material. Further, the method includes placing the at least one continuous reinforcement ring member layer atop the one or more printed layers of the wall of the tower structure. Moreover, the method includes printing and depositing, via the printhead assembly of the additive printing system, one or more additional printed layers of the wall of the tower structure atop the at least one continuous reinforcement ring member layer.

In another aspect, the present disclosure is directed to an assembly for manufacturing at least one continuous reinforcement ring member layer for reinforcing a structure. The assembly includes one or more continuous rolls of a reinforcement material, the reinforcement material comprising a pultruded polymer material. The assembly also includes a fixture secured to a portion of the one or more continuous rolls of the reinforcement material. The fixture includes a plurality of arm members extending radially from the central axis. Each arm member of the plurality of arm members has a locating guide secured thereto. Further, the fixture is rotatable about a central axis to unwind the one or more continuous rolls of the reinforcement material to form the at least one continuous reinforcement ring member layer comprising one or more coils. Moreover, the locating guides are configured to receive and secure the one or more coils of the at least one continuous reinforcement ring member layer therein.

In yet another aspect, the present disclosure is directed to a reinforcement assembly for a structure. The reinforcement assembly includes at least one continuous reinforcement ring member layer constructed of a plurality of coils of reinforcement material stacked into a plurality of layers. The reinforcement material includes a fiber-reinforced pultruded polymer material. Further, the reinforcement material has a diameter of less than about 20 millimeters. The reinforcement assembly further includes a plurality of supports circumferentially spaced around and secured to the at least one continuous reinforcement ring member layer.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Figure 1:
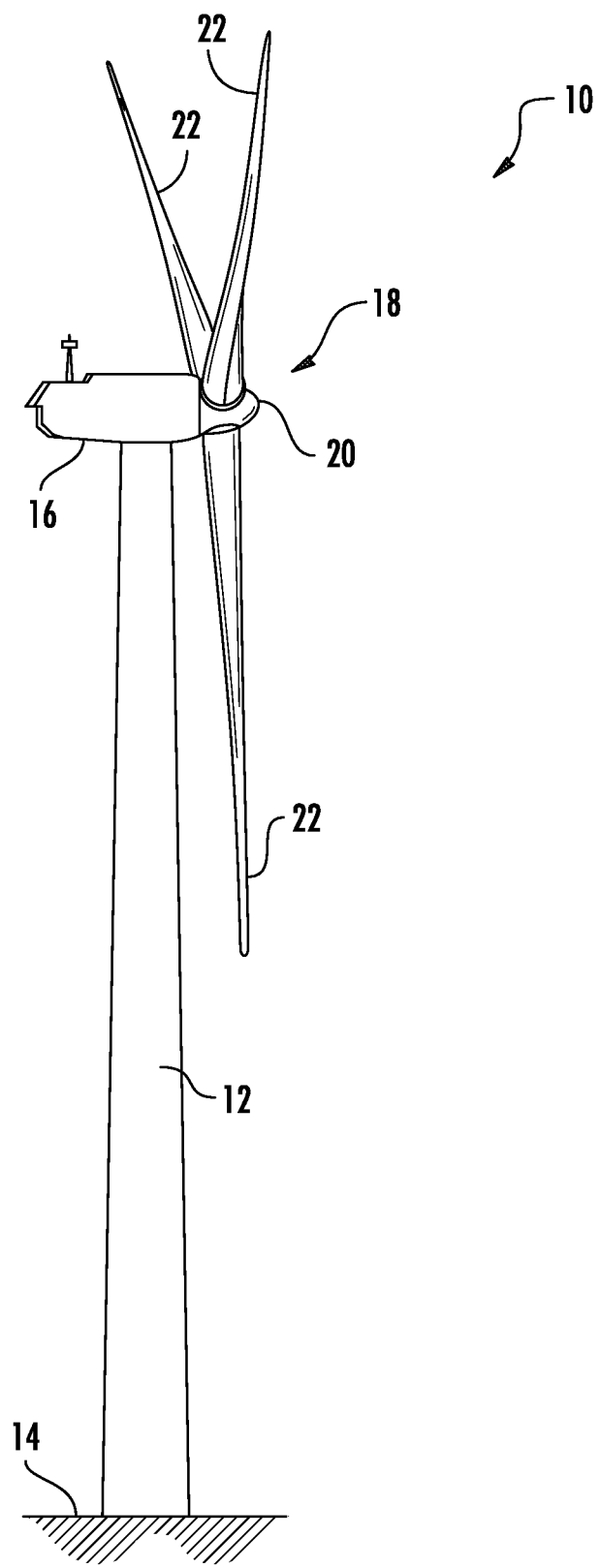
FIG. 1 illustrates a perspective view of an embodiment of a wind turbine according to the present disclosure.

Repeat use of reference characters in the present specification and drawings is intended to represent the same or analogous features or elements of the present disclosure.

DETAILED DESCRIPTION

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of an embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to additively manufactured structures, additive manufacturing systems, and additive manufacturing methods for manufacturing a tower structure, such as a wind turbine tower. "Additively manufactured structures" as used herein generally refers to structures formed using automated deposition of sequential layers (e.g., print layers) of, e.g., a cementitious material, such as concrete, and/or other construction materials, via "additive manufacturing" technologies such as additive manufacturing, 3-D printing, spray deposition, extrusion additive manufacturing, concrete printing, automated fiber deposition, as well as other techniques that utilize computer numerical control (CNC) and multiple degrees of freedom to deposit material.

"Additive manufacturing" as used herein refers to processes used to synthesize three-dimensional objects in which successive layers of material are formed under computer control to create the objects. As such, objects of almost any size and/or shape can be produced from digital model data. It should further be understood that the additive manufacturing methods of the present disclosure may encompass three degrees of freedom, as well as more than three degrees of freedom such that the printing techniques are not limited to printing stacked two-dimensional layers but are also capable of printing curved and/or irregular shapes.

In order to achieve the requisite structural strength for modern large-scale construction, additively manufactured structures generally require reinforcement. Known methods for reinforcing wind turbine towers often utilize vertical rebar and/or a rebar cage. For example, a common construction practice is to manually place a prefabricated rebar cage in the desired location prior to pouring concrete. While such approaches may reinforce the tower structure, they are often labor intensive and costly, and may not be compatible with construction via additive manufacturing.

Accordingly, the present disclosure is directed to a novel method of manufacturing a tower structure. In particular, the method includes printing and depositing, via a printhead assembly of an additive printing system, one or more printed layers of a wall of the tower structure. Further, the method includes unwinding at least one continuous roll of a reinforcement polymer material to form a continuous reinforcement ring member. In an embodiment, for example, the continuous roll(s) of the reinforcement material may include pultruded fiberglass formed into long lengths of material in coiled form, carbon fiber, or any other fiber suitable for reinforced structures. Furthermore, in an embodiment, the resin system in the reinforcement material may include, for example, thermosets such as polyester, vinylester, and epoxies. In another embodiment, the resin system may include thermoplastics such as Elium® from Arkema. In such embodiments, by using the reinforcement polymer material, the tower structures have an increased life expectancy due to the corrosion resistance of the polymer material (e.g., versus conventional steel rings). In addition, the reinforcement polymer material also results in a weight reduction which helps to reduce transportation costs and ease of ring placement.

Thus, the method includes unwinding this coiled material to produce the continuous reinforcement ring member by coiling the long lengths of the reinforcement material (e.g., rebar) into a generally circular shape, while also maintaining appropriate gaps for concrete/cement flow between wraps and/or as required by local building codes for concrete reinforced structures. As such, the continuous reinforcement ring member can be formed with any diameter on demand, at or near the location of the tower structure, such as a wind farm. The method further includes placing the continuous reinforcement ring member atop the printed layer(s) of the wall of the tower structure. Further, the method may also include printing and depositing, via the printhead assembly of the additive printing system, one or more additional printed layers of the wall of the tower structure atop the continuous reinforcement ring member.

In particular embodiments, the method may include unspooling the continuous roll(s) of the reinforcement material (e.g., rebar) and respooling the material into at least one continuous reinforcement ring member having a sufficient number of rebar wraps/coils that are held in place with one or more locating guides. As used herein, a wrap or coil generally refers to the individual circular wraps within an entire coiled layer. For example, in an embodiment, the locating guides may be simple mechanical components with one or more radially spaced retention features designed to hold the reinforcement material to allow the spiral attachment to the multitude of locating guides to retain the target shape of the tower structure.

In certain embodiments, the unspooling/respooling may be achieved using a turntable-type fixture with a multitude of locating features or holes to support the locating guides at desired locations, which may be adjustable. In particular embodiments, the continuous roll(s) of the reinforcement material may be in a coiled state under significant load. In such embodiments, the locating guides allow the continuous roll(s) of the reinforcement material to be respooled and held in place indefinitely. In further embodiments, if this prestress is undesirable, the continuous roll(s) of the reinforcement material (which may be constructed of a thermoset material or thermoplastic material), may be made using Elium® thermoplastic resin or similar. Thus, in an embodiment, the continuous roll(s) of the Elium® thermoplastic reinforcement material may be warmed above its glass transition temperature for a period of time to relax the material to relieve built in stress. Other reinforcement supports may also be secured to the continuous reinforcement ring member for additional support prior to encasement in concrete via 3D printing or other cement casting process using, for example, wire ties or another other suitable fastening means.

In further embodiments, in the area of the tower door (or any other desired area), the continuous reinforcement ring member(s) may be constructed as a full ring and after casting and solidification and/or printing and depositing one or more of the tower layers using the cementitious material, the excess material in the doorway (or any other suitable area) may be cut away and recycled/discarded. In an embodiment, for example, the continuous reinforcement ring member(s) may be left completely intact and placed atop the printed layer(s) of the wall of the tower structure. After placement and printing, one or more areas of the continuous reinforcement ring member(s) may be removed (e.g., by cutting out and removing ring portions in certain areas). In such embodiments, the cementitious material can be at least partially cured enough to support the continuous reinforcement ring member(s) from distorting when certain areas are removed.

In alternative embodiments, wherein the continuous roll(s) of the reinforcement material includes Elium® thermoplastic resin, a partial ring member may be formed that includes a space or gap for the door space. Thus, in an embodiment, the Elium® thermoplastic resin may be warmed above its glass transition temperature for a period of time to relax the material to relieve built in stress. Afterwards, the desired door section can be cut out of the continuous reinforcement ring member. In such embodiments, additional securing of the cut ends may also be provided to further secure the ring member.

Accordingly, the present disclosure provides many advantages not present in the prior art. For example, in an embodiment, methods of the present disclosure are less labor intensive than conventional methods and do not face the same logistical challenges with shipping, since multiple rolls of the coiled polymer reinforcement material can be shipped using a single truck. Moreover, with the increasing size of wind turbine turbines, many reinforcement rings are needed (sometimes more than 100) and the tower structure oftentimes has a diameter than changes with the height of the tower. The methods of the present disclosure, however, can quickly manufacture many reinforcement ring members having any suitable diameter to accommodate the changing diameter of the tower structure. Furthermore, by using a polymer material rather than steel to form the continuous reinforcement ring member(s), the present disclosure provides improved corrosion resistance and allows for a longer life than conventionally reinforced towers.

Referring now to the drawings, FIG. 1 illustrates a perspective view of an embodiment of a wind turbine 10 according to the present disclosure. As shown, the wind turbine 10 generally includes a tower structure 12 extending from a support surface 14, a nacelle 16 mounted on the tower structure 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Figure 2:
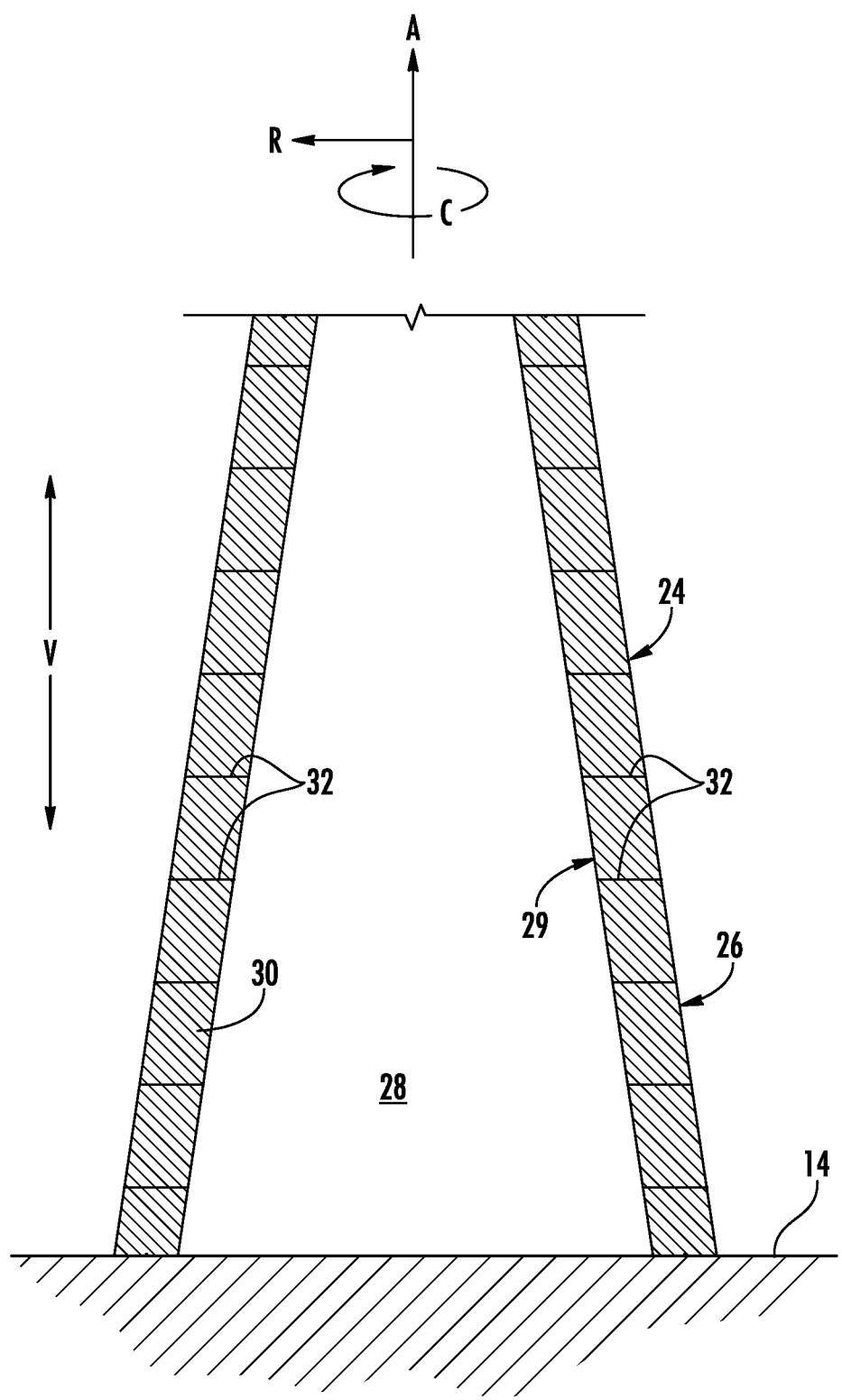
FIG. 2 illustrates a partial, cross-sectional view of an embodiment of a tower structure of a wind turbine according to the present disclosure.

Referring now to FIG. 2, the tower structure 12 of the wind turbine 10 of FIG. 1 is described in more detail according to an embodiment of the present disclosure. Specifically, FIG. 2 illustrates a partial, cross-sectional view of an embodiment of the tower structure 12 of the wind turbine 10 according to the present disclosure. As shown, the tower structure 12 defines a generally circumferential tower wall 24 having an outer surface 26 and an inner surface 29. Further, as shown, the circumferential tower wall 24 generally defines a hollow interior 28 that is commonly used to house various turbine components (e.g., a power converter, transformer, etc.).

Furthermore, as shown, the tower structure 12 may be formed of one or more cementitious materials 30 reinforced with one or more reinforcement members 32. As used herein, in an embodiment, the cementitious materials 30 may include any suitable workable paste that is configured to bind together after curing to form a structure. Suitable cementitious materials 30 include, for example, concrete, pitch resin, asphalt, geopolymers, polymers, cement, mortar, cementitious compositions, or similar materials or compositions. Moreover, in an embodiment, the reinforcement members 32 may include, for example, reinforcement rings, as described in more detail herein, elongated cables or wires, helical cables or wires, reinforcing bars (i.e., rebar), mesh reinforcing fibers (metallic or polymeric), or any other suitable structural reinforcement members. Further, it should be understood that such reinforcement members 32 may be placed along the entire height of the tower structure 12 (e.g., as shown in FIG. 2) or along only a portion of the tower height.

According to an embodiment of the present disclosure, an adhesive material, a cold joint primer, and/or steel/metal/alloy/composite frame(s) or end cap(s), for example, may also be provided between one or more of the cementitious materials 30 and the support surface 14 and/or the cementitious material(s) 30 and the reinforcement member(s) 32. Thus, these materials may further supplement or complement interlayer bonding between materials, facilitate integration or use of prefabricated components or formwork, or provide aesthetic benefits.

"Adhesive material" as used herein may also refer to cementitious material such as mortar, polymeric materials, and/or admixtures of cementitious material and polymeric material. Adhesive formulations that include cementitious material are referred to herein as "cementitious mortar." "Cementitious mortar" as used herein refers to any cementitious material that may be combined with fine aggregate. Cementitious mortar made using Portland cement and fine aggregate is sometimes referred to as "Portland cement mortar," or "OPC." Adhesive formulations that include an admixture of cementitious material and polymeric material are referred to herein as "polymeric mortar." Any cementitious material may be included in an admixture with a polymeric material, and optionally, fine aggregate. Adhesive formulations that include a polymeric material are referred to herein as "polymeric adhesive."

Polymeric materials that may be utilized in an adhesive formulation include any thermoplastic or thermosetting polymeric material, such as acrylic resins, polyepoxides, vinyl polymers (e.g., polyvinyl acetate (PVA), ethylene-vinyl acetate (EVA)), styrenes (e.g., styrene butadine), as well as copolymers or terpolymers thereof. Characteristics of certain polymeric materials are described in ASTM C1059/C1059M-13, Standard Specification for Latex Agents for Bonding Fresh to Hardened Concrete.

Accordingly, in an embodiment, as explained in more detail herein, the tower structure 12 is formed using additive manufacturing. It should be understood that although the tower structure 12 is illustrated as being part of a wind turbine, the present disclosure is not limited to wind turbine towers, but may be utilized in any application having similar tower structures. For example, the present disclosure may be utilized in the additive manufacturing of homes, buildings, portions of buildings, bridges, towers, poles, and similar. Further, the methods described herein may also apply to manufacturing any similar structure that benefits from the advantages described herein, e.g., a wind turbine support tower, a cooling tower, a communications tower, a bridge pylon, a smokestack, a transmission tower, an observation tower, a dwelling, an office, an ornamental tower, a water tower, and/or other similar structures.

Figure 3:
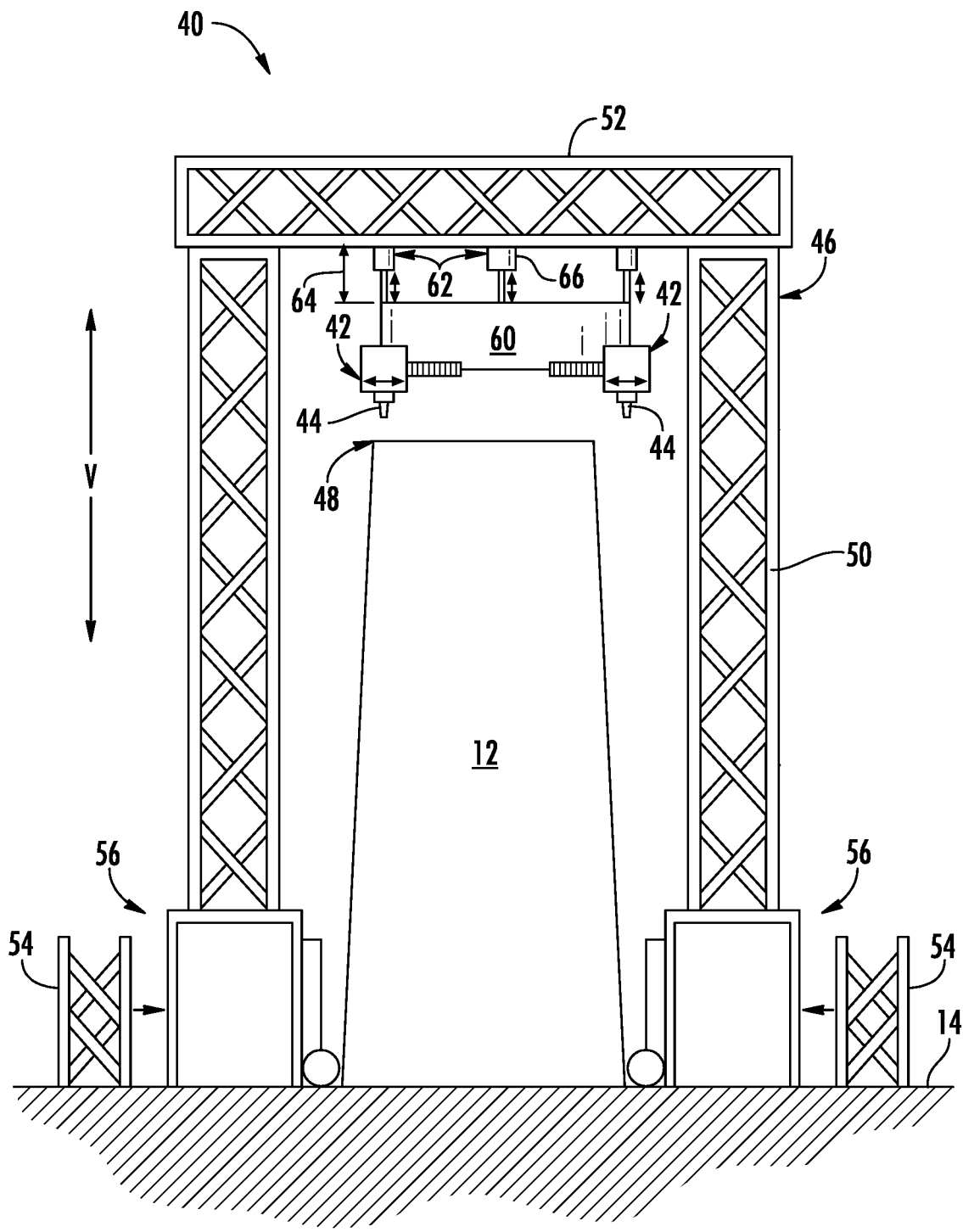
FIG. 3 illustrates a schematic view of an embodiment of an additive printing system being used to print structures according to the present disclosure.
Figure 4:
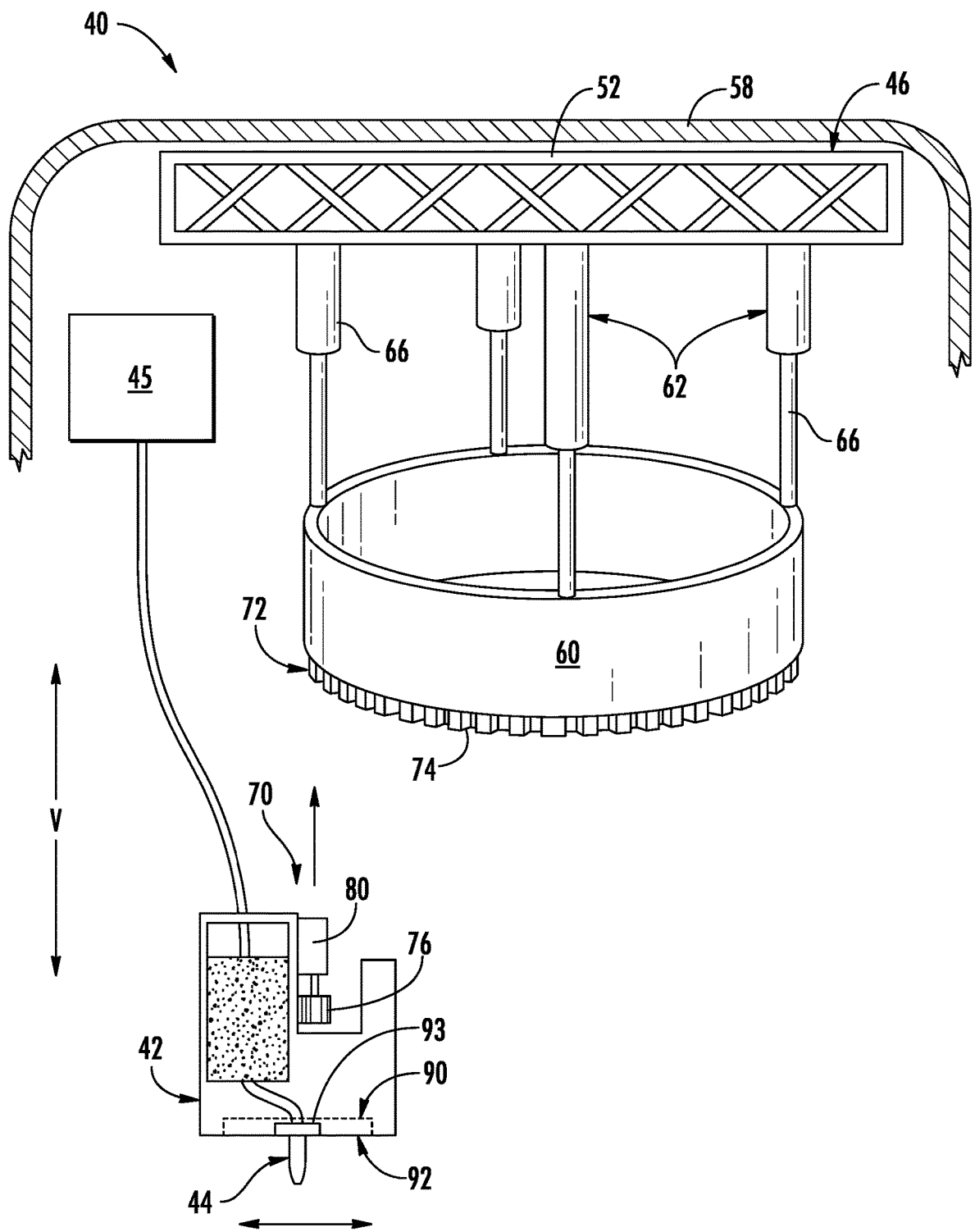
FIG. 4 illustrates a detailed view of certain components of the additive printing system of FIG. 3 according to the present disclosure.
Figure 5:
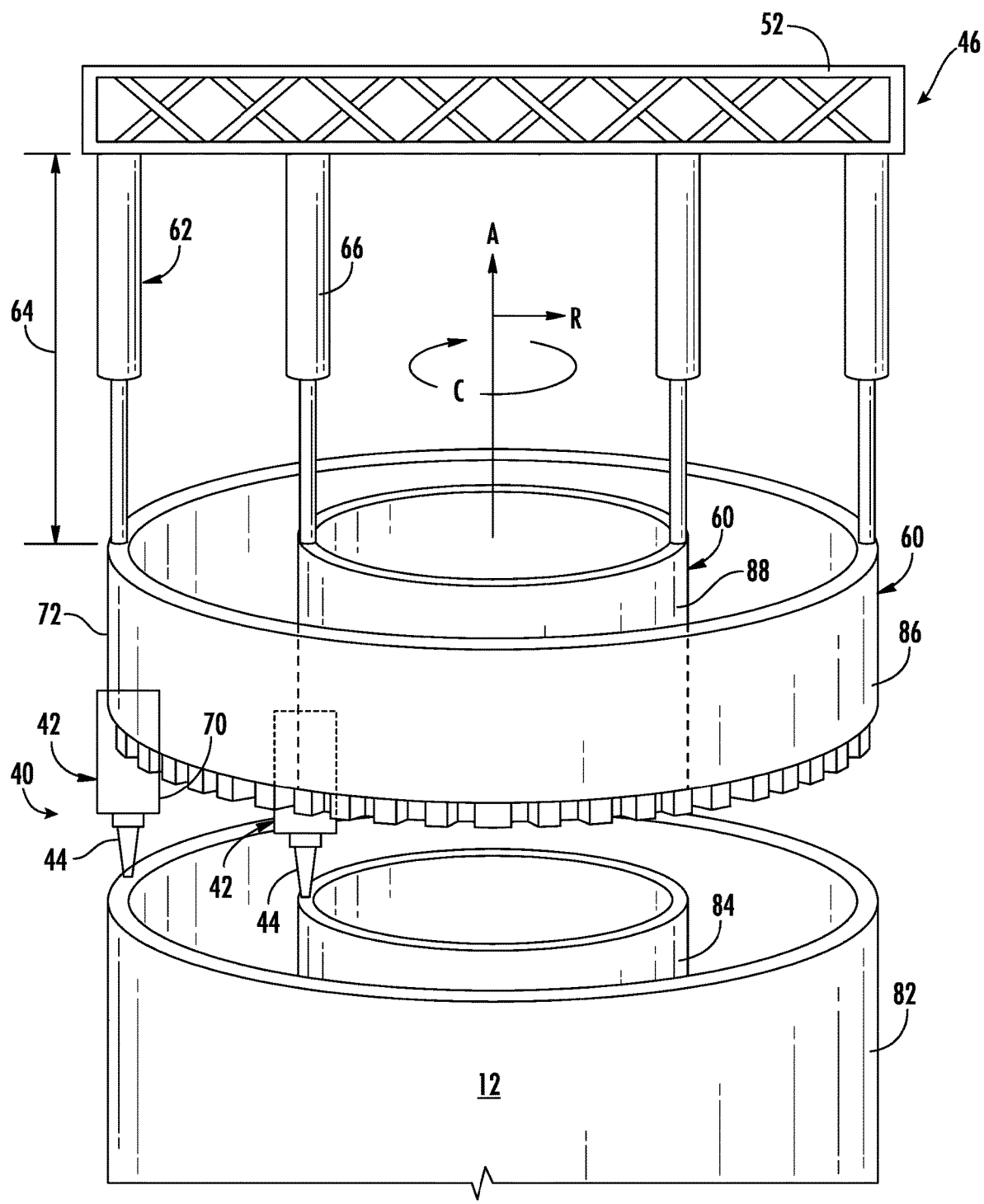
FIG. 5 illustrates a detailed view of another embodiment of certain components of an additive printing system according to the present disclosure.

Referring now to FIGS. 3-5, an additive printing system 40 for forming the tower structure 12 is illustrated according to an embodiment of the present disclosure. Notably, all or part of tower structure 12 of FIGS. 1-2 may be printed, layer-by-layer, using the additive printing system 40, which may use any suitable mechanisms for depositing layers of additive material, such as concrete, to form the tower structure 12. More specifically, as shown in FIG. 3 and described herein, the additive printing system 40 includes one or more printer heads 42 having any suitable number of nozzles 44 that may be independently movable to simultaneously print layers of the tower structure 12. Moreover, in an embodiment, the additive printing system 40 may be controlled by a controller to form an object programmed within a processor of the controller (such as a CAD file; described in detail herein).

More specifically, and still referring to FIGS. 3-5, the additive printing system 40 may include a vertical support structure 46 which is generally configured for suspending one or more of the printer heads 42 above the tower structure 12 during the printing process. In this regard, the vertical support structure 46 may extend from the support surface 14 in a vertical direction V to a position at least partially above a top 48 of the tower structure 12.

As illustrated, the vertical support structure 46 may include a plurality of support towers 50 and one or more gantry beams 52 that extend between at least two of the support towers 50. Although two support towers 50 and a single gantry beam 52 are illustrated in the FIGS. 3-5, it should be appreciated that any suitable number and position of support towers 50 may be used according to alternative embodiments. In addition, the support towers 50 and the gantry beams 52 are illustrated as being truss-like structures (e.g., similar to a tower crane), but could be formed in any other suitable manner or have any other configuration according to alternative embodiments.

In addition, although the vertical support structure 46 is illustrated as being positioned on the outside of the tower structure 12, it should be appreciated that according to alternative embodiments, the vertical support structure 46 may be positioned inside the tower structure 12. According to still other embodiments, the vertical support structure 46 may include the support towers 50 positioned both inside and outside of the tower structure 12. In addition, the additive printing system 40 may be suspended from the vertical support structure 46 using any other suitable system or mechanism.

Notably, during the additive printing process, the top 48 of tower structure 12 is built layer-by-layer, rising along the vertical direction V. Therefore, the vertical support structure 46 may be an expandable support structure which may be raised along with the height of tower structure 12. In this regard, the vertical support structure 46 may be formed from a plurality of stacked segments 54 which are positioned adjacent each other along the vertical direction V and joined to form the rigid vertical support structure 46. Thus, when the tower structure 12 approaches the gantry beam 52 of the vertical support structure 46, additional segments 54 may be added to stacked segments to raise the overall height of vertical support structure 46.

Referring specifically to FIG. 3, additional segments 54 may be combined with stacked segments to raise the vertical support structure 46 using a jacking system 56. In general, as shown, the jacking system 56 may be positioned proximate the support surface 14 and is configured for raising the vertical support structure 46 (e.g., including the stacked segments and the gantry beams 52) and inserting additional segments 54. Specifically, a separate jacking system 56 may be positioned at a bottom of each support tower 50.

In certain situations, as shown particularly in FIG. 4, it may be desirable to protect the tower structure 12 and components of the additive printing system 40 from the external environment in which they are being used. In such embodiments, as shown, a tower cover 58 may be placed atop the additive printing system 40. For example, in an embodiment, the tower cover 58 may be a fabric-like material draped over or attached to the vertical support structure 46 (e.g., over the support towers 50 and/or the gantry beams 52).

As mentioned above, the vertical support structure 46 is generally configured for supporting one or more of the printer heads 42 and or other modules which facilitate the formation of the tower structure 12. Referring specifically to FIGS. 3 through 5, the additive printing system 40 may further include one or more support members, such as support rings 60, that are suspended from the vertical support structure 46, or more specifically from gantry beams 52, above the tower structure 12. For example, as illustrated, the support ring 60 is mounted to the gantry beam 52 using a vertical positioning mechanism 62. In general, the vertical positioning mechanism 62 is configured for adjusting a height or vertical distance 64 measured between the gantry beam 52 and a top of support ring 60 along the vertical direction V. For example, the vertical positioning mechanism 62 may include one or more hydraulic actuators 66 extending between gantry beam 52 and support ring 60 for moving support ring 60 and printer heads 42 along the vertical direction V as tower structure 12 is built up layer-by-layer.

As further illustrated, the hydraulic actuators 66 are configured for adjusting the vertical distance 64 to precisely position nozzles 44 of the printer heads 42 immediately above the top 48 of the tower structure 12. In this manner, the additive printing process may be precisely controlled. However, it should be appreciated that according to alternative embodiments, the vertical motion of the printer heads 42 may be adjusted in any other suitable manner. For example, according to an embodiment, the support ring 60 may be rigidly fixed to the gantry beam 52 while the support ring 60 and/or the printer heads 42 are used to facilitate vertical motion to precisely position nozzles 44. For example, the printer heads 42 may be slidably mounted to the support ring 60 using a vertical rail and positioning mechanism to adjust the vertical position relative to the support ring 60 and the tower structure 12.

According to the illustrated embodiment, the printer head(s) 42 is movably coupled to the support ring 60 such that the nozzles 44 may deposit cementitious material 30 around a perimeter of tower structure 12 while the support ring 60 remains rotationally fixed relative to gantry beam 52. According to an embodiment, the cementitious material 30 may be provided through any suitable supply system 45 (see, e.g., FIG. 4). In this regard, as shown in FIGS. 4 and 5, a drive mechanism 70 may operably couple the printer head(s) 42 to the support ring 60 such that printer head(s) 42 may be configured for moving around a perimeter 72 of the support ring 60 (e.g., about a circumferential direction C) while selectively depositing the cementitious material 30. One exemplary drive mechanism 70 is described below and illustrated in the figures, but it should be appreciated that other drive mechanisms are contemplated and within the scope of the present disclosure.

As best shown in FIG. 4, for example, the drive mechanism 70 may include a ring gear 74 that is positioned on the support ring 60 and a drive gear 76 (FIG. 4) that is rotatably mounted to printer head 42. Thus, when printer head(s) 42 is mounted on the support ring 60, the drive gear 76 engages ring gear 74. The drive mechanism 70 may further include a drive motor 80 that is mechanically coupled to the drive gear 76 for selectively rotating the drive gear 76 to move printer head(s) 42 around a perimeter 72 of the support ring 60. In this manner, the support ring 60 may remain stationary while the printer head(s) 42 moves around the support ring 60 while depositing the cementitious material 30 to form a cross-sectional layer of tower structure 12.

Although the drive mechanism 70 is illustrated herein as a rack and pinion geared arrangement using drive gear 76 and ring gear 74, it should be appreciated that any other suitable drive mechanism 70 may be used according to alternative embodiments. For example, the drive mechanism 70 may include a magnetic drive system, a belt drive system, a frictional roller drive system, or any other mechanical coupling between printer head(s) 42 and support ring 60 which permits and facilitates selective motion between the two.

In addition, in an embodiment, the support ring 60 may generally have a diameter that is substantially equivalent to a diameter of the tower structure 12. However, it may be desirable to print the tower structure 12 having a non-fixed diameter or a tapered profile. In addition, as illustrated for example in FIG. 5, the tower structure 12 may include an outer tower wall 82 spaced apart along a radial direction R from an inner tower wall 84. For example, the outer tower wall 82 may be printed to define a mold for receiving poured concrete, e.g., to decrease printing time and total construction time.

Thus, as shown in FIG. 5, the additive printing system 40 may include a plurality of concentric support rings 60 and printer heads 42 for simultaneously printing each of the outer tower wall 82 and the inner tower wall 84. Specifically, as illustrated, an outer support ring 86 may be positioned above the outer tower wall 82 and have a substantially equivalent diameter to the outer tower wall 82. Similarly, an inner support ring 88 may be positioned above the inner tower wall 84 and have a substantially equivalent diameter to the inner tower wall 84. According to this embodiment, each of outer support ring 86 and inner support ring 88 may include dedicated printer heads 42 and/or other modules for facilitating the printing process of outer tower wall 82 and inner tower wall 84, respectively.

Referring again to FIG. 4, the printer head(s) 42 may include mechanisms for adjusting the position of nozzles 44 on printer head(s) 42. For example, printer head(s) 42 may include a radial adjustment mechanism 90 that is configured for moving print nozzle 44 along the radial direction R. Specifically, according to the illustrated embodiment, as shown in FIG. 4, the radial adjustment mechanism 90 may include a slide rail 92 mounted to the printer head 42. The slide rail 92 extends substantially along the radial direction and is configured for slidably receiving the nozzle 44.

The radial adjustment mechanism 90 may further include an actuating mechanism 93 that moves the print nozzle 44 along the radial direction R within the slide rail 92. For example, the actuating mechanism 93 may include any suitable actuator or positioning mechanism for moving nozzle 44 within the slide rail 92. In this regard, for example, the actuating mechanism 93 may include one or more of a plurality of linear actuators, servomotors, track conveyor systems, rack and pinion mechanisms, ball screw linear slides, etc.

Figure 6:
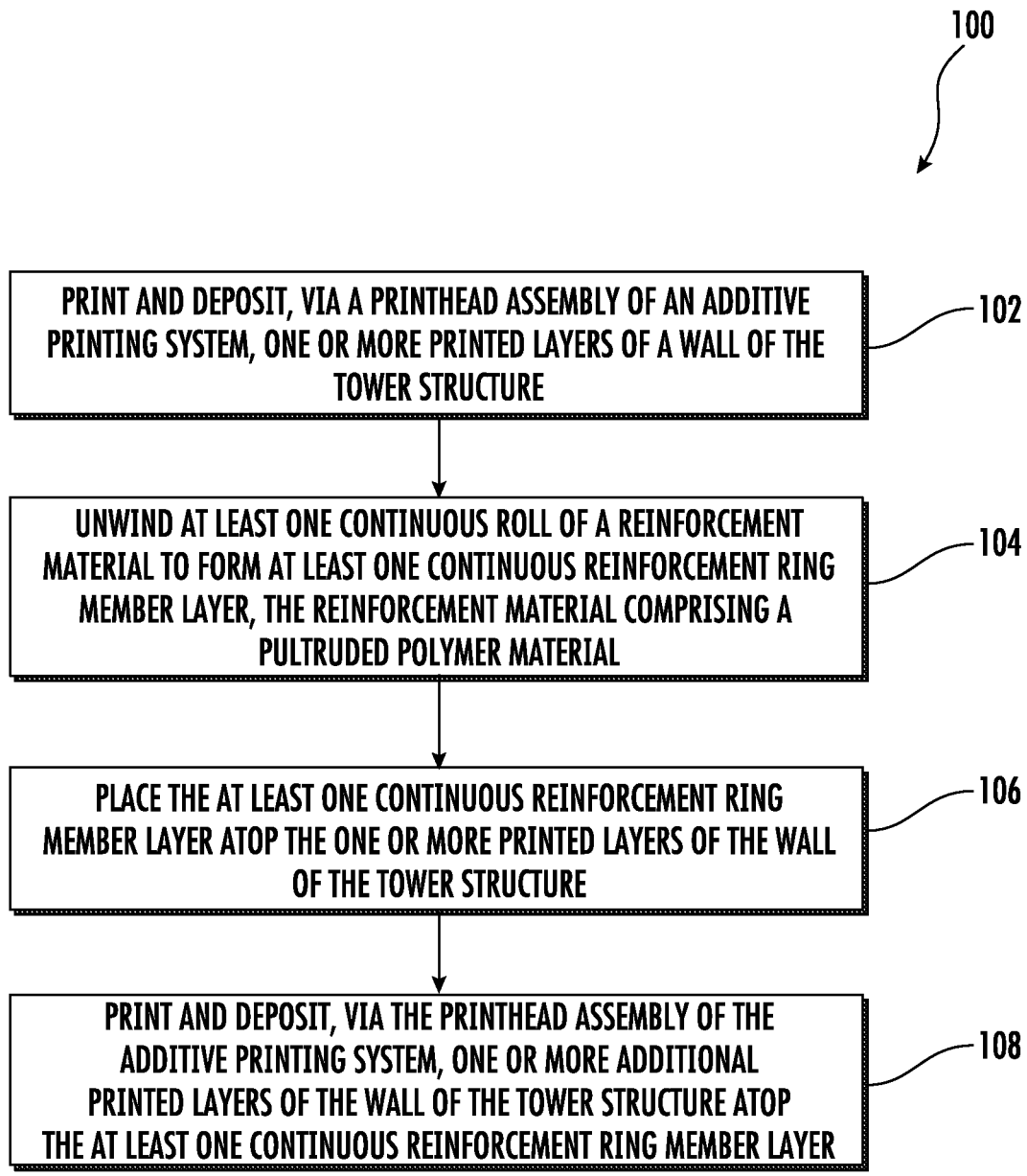
FIG. 6 illustrates a flow diagram of an embodiment of a method of manufacturing a tower structure according to the present disclosure.

Referring now to FIG. 6, a flow diagram of an embodiment of a method 100 of manufacturing a structure, such as tower structure 12, is provided. In particular, the method 100 can be used to form the tower structure 12 of FIGS. 1-5 using the additive printing system 40 of FIGS. 3-5 and/or the assembly 150 of FIG. 7A-12, or to form any other suitable structure or tower using any other suitable additive printing device. It should be appreciated that the method 100 is discussed herein only to describe aspects of the present disclosure and is not intended to be limiting. Further, though FIG. 6 depicts the method 100 having steps performed in a particular order for purposes of illustration and discussion, those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained with respect to the tower structure 12 and the assembly 150 as an example, it should be appreciated that these methods may be applied to the operation of additive printing device to form any suitable tower structure.

In particular, as shown at (102), the method 100 includes printing and depositing, via a printhead assembly of an additive printing system, one or more printed layers of a wall of the tower structure. As shown at (104), the method 100 includes unwinding at least one continuous roll of a reinforcement material (such as a pultruded polymer material), e.g., via a fixture, to form a continuous reinforcement ring member. Thus, in example embodiments, unwinding the continuous roll of the reinforcement material to form the continuous reinforcement ring member may include securing a portion of the continuous roll of the reinforcement material to a fixture and rotating the fixture about a central axis to unwind the continuous roll of the reinforcement material to form the continuous reinforcement ring member. In certain embodiments, as mentioned, the continuous reinforcement ring member may have one or more coils, such as a plurality of coils. Moreover, in an embodiment, the coils may be stacked into a plurality of layers. Furthermore, in an embodiment, the reinforcement material itself (e.g., the rebar) may have a diameter of less than about 20 millimeters.

In additional embodiments, as explained and described herein, the fixture may include a plurality of arm members extending radially from the central axis. In such embodiments, each arm member may further include a locating guide for receiving and securing the coil(s) of the continuous reinforcement ring member. Thus, the method 100 may include setting a position of the locating guides on one or more of the arm members. For example, in an embodiment, setting the position of the locating guides on one or more of the arm members may include securing positioning pins of the locating guides into corresponding holes on one of the arm members. In alternative embodiments, setting the position of the locating guides on one or more of the arm members may include sliding the locating guides along one of the arm members to a desired radial location and securing the locating guides on one of the arm members at the desired radial location. In such embodiments, setting the position of the locating guides on one or more of the arm members sets a desired diameter of the continuous reinforcement ring member to correspond with a diameter of the tower structure. Moreover, in an embodiment, the locating guides may be positioned via a linear actuator that can be controlled via CNC, e.g., using controller 200, to automatically reposition one or more of the locating guides as needed when making a new set of ring diameters.

Referring still to FIG. 6, as shown at (106), the method 100 includes removing the continuous reinforcement ring member from the fixture. Thus, as shown at (108), the method 100 includes placing the continuous reinforcement ring member atop the one or more printed layers of the wall of the tower structure. In further embodiments, the method 100 may include securing a plurality of supports to the continuous reinforcement ring member before placing the continuous reinforcement ring member atop the one or more printed layers of the wall of the tower structure. In such embodiments, the locating guides may remain in place after removing the continuous reinforcement ring member from the fixture to maintain positioning of the coil(s). Moreover, as shown at (110), the method 100 includes printing and depositing, via the printhead assembly of the additive printing system, one or more additional printed layers of the wall of the tower structure atop the continuous reinforcement ring member.

Figure 20:
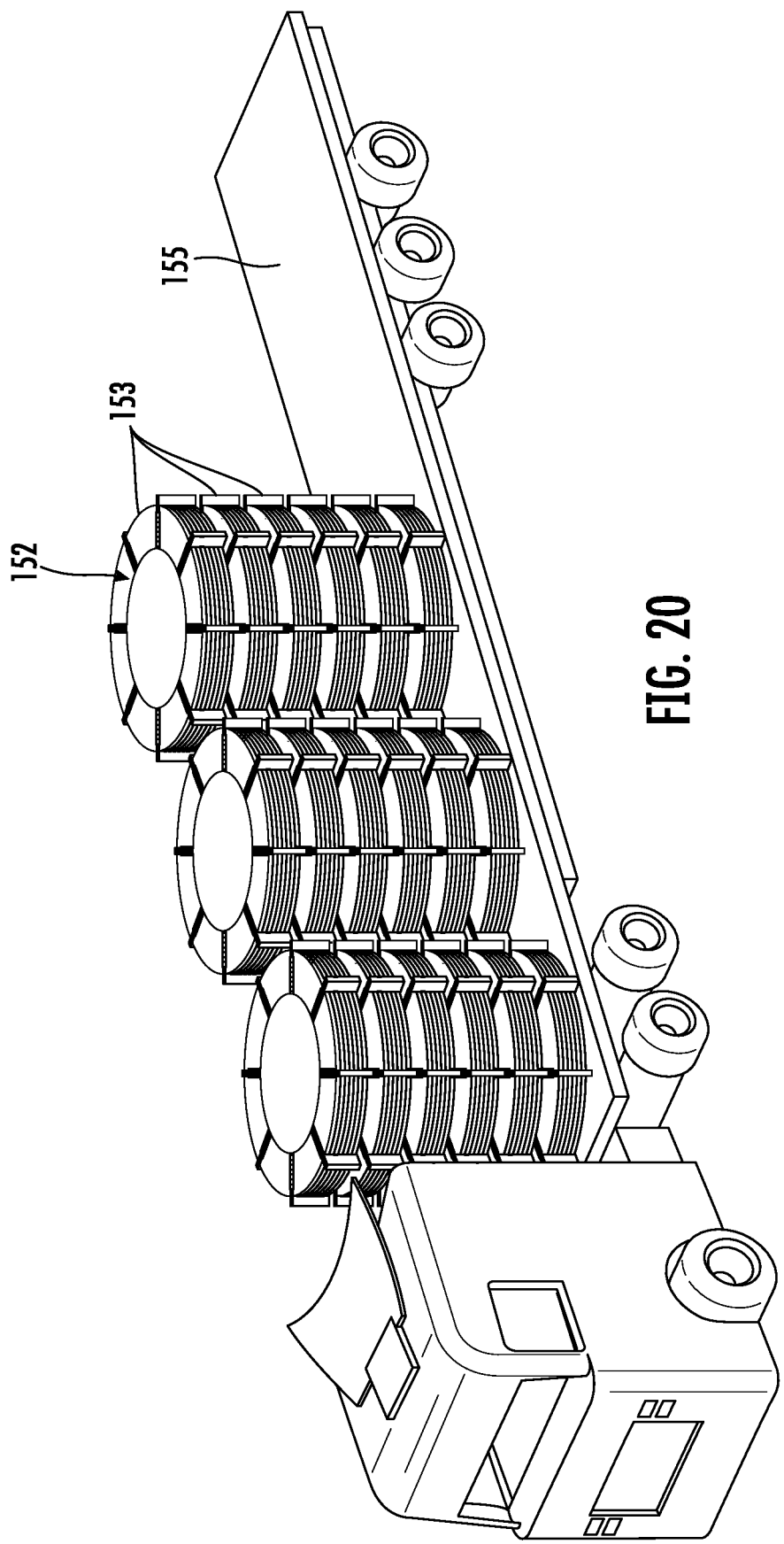
FIG. 20 illustrates a perspective view of a truck having a plurality of rolls of reinforcement material for manufacturing a continuous reinforcement ring member for a tower structure according to the present disclosure.

The method of FIG. 6 can be better understood with reference to FIGS. 7A-13. In particular, as shown, FIGS. 7A-14 illustrate various views of components of an assembly 150 for manufacturing a continuous reinforcement ring member for reinforcing a structure, such as tower structure 12. More specifically, as shown, the assembly 150 includes at least one continuous roll of a reinforcement material 152. Furthermore, in an embodiment, as shown in FIG. 20, the continuous roll(s) of the reinforcement material 152 may be sized such that a plurality of the rolls 153 can easily fit onto a truck bed 155 for shipping.

For example, in an embodiment, the reinforcement material 152 may include a pultruded polymer material. As used herein, the terms "pultruded," "pultrusions," or similar generally encompass reinforced materials (e.g., fibers or woven or braided strands) that are impregnated with a resin and pulled through a stationary die such that the resin cures, solidifies, or undergoes polymerization. As such, the process of manufacturing pultruded members is typically characterized by a continuous process of composite materials that produces composite parts having a constant cross-section. Thus, the reinforcement material 152 may include pultrusions constructed of reinforced thermoset or thermoplastic materials. In addition, the pultruded components may be produced from rovings, which generally encompass long and narrow bundles of fibers that are not combined until joined by a cured resin.

The thermoplastic materials described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

In addition, certain thermoplastic resins provided herein, such as PMMA and polyamides, for example, can be impregnated into structural fabrics via infusion via vacuum assisted resin transfer molding (VARTM) or other suitable infusion methods known in the art. One example of an infusible PMMA based resin system may be Elium® from Arkema Corporation. In such embodiments, infusible thermoplastics can be infused into fabrics/fiber materials as a low viscosity mixture of resin(s) and catalyst.

Further, the thermoset materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

Figure 7A:
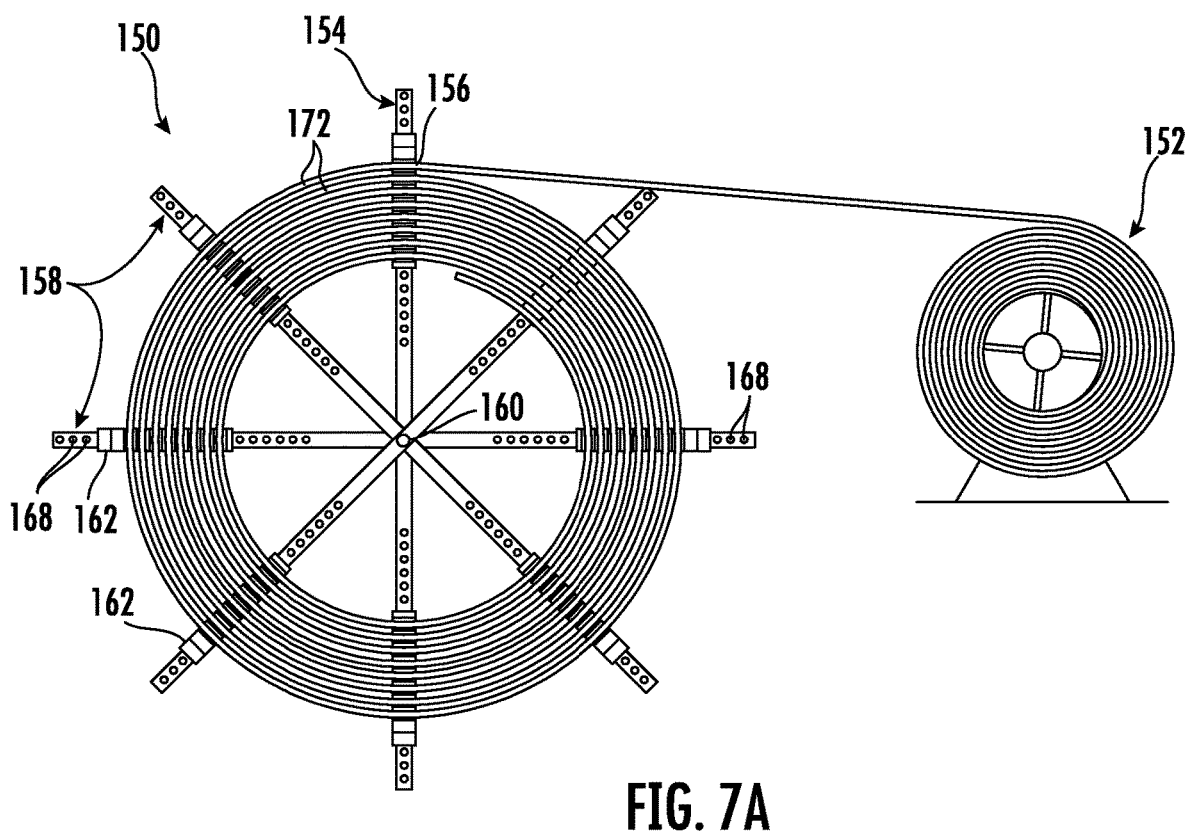
FIGS. 7A and 7B illustrate various views of components of an apparatus for manufacturing a continuous reinforcement ring member for a tower structure according to the present disclosure.
Figure 7B:
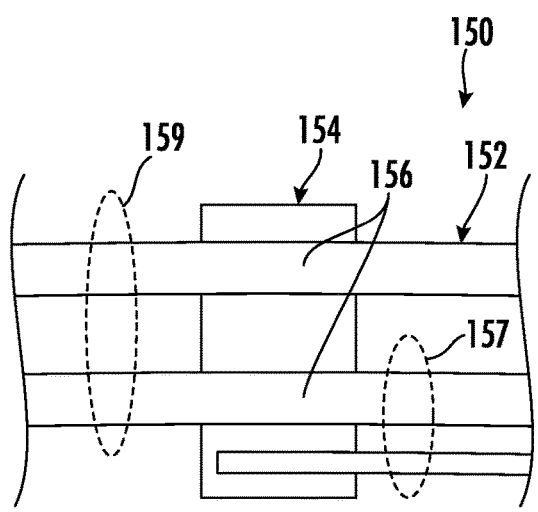

Referring particularly to FIGS. 7A and 7B, the assembly 150 further includes a fixture 154 secured to a portion 156 of the continuous roll(s) of the reinforcement material 152. For example, as shown particularly in FIG. 7B, the portion 156 of the continuous roll of the reinforcement material 152 may be secured to the fixture 154, at least initially, via securement means 157. For example, in certain embodiments, the securement means 157 may be a wire tie, wrap, loop, or similar. In addition, as shown in FIG. 7B, adjacent wraps/coils 172 of the reinforcement material 152 may also be held together via similar securement means 159, such as a wire tie, wrap, loop, etc. In such embodiments, securement means 159 are configured to assist with holding the overall shape of the continuous reinforcement ring member 170 until the continuous reinforcement ring member 170 is placed into the tower structure 12. In such embodiments, the securement means 157, 159 can be easily removed as needed to remove the continuous reinforcement ring member 170 from the fixture 154, e.g., so as to place the continuous reinforcement ring member 170 atop one or more printed layers of the wall of the tower structure.

Figure 8:
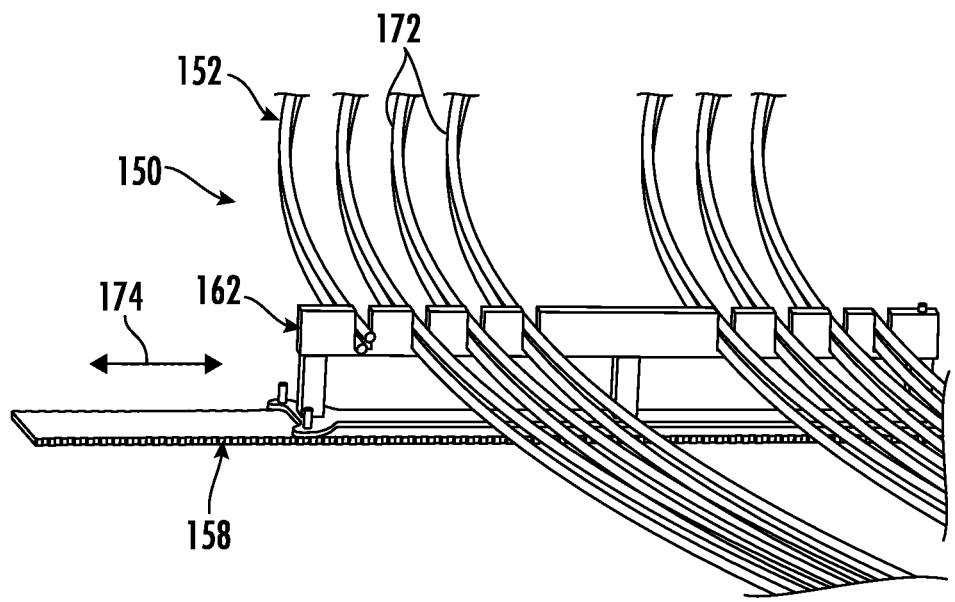
FIG. 8 illustrates a partial, perspective view of an embodiment of an apparatus for manufacturing a continuous reinforcement ring member for a tower structure according to the present disclosure, particularly illustrating a locating guide and an arm member of the apparatus.

Moreover, as shown particularly in FIG. 7A, the fixture 154 includes a plurality of arm members 158 extending radially from the central axis 160. Furthermore, as shown in FIGS. 7A and 8, each arm member 158 includes a locating guide 162 secured thereto. Thus, in an embodiment, the fixture 154 is rotatable about the central axis 160 to unwind the continuous roll(s) of the reinforcement material 152 to form at least one continuous reinforcement ring member 170 (FIGS. 8 and 11) having a plurality of coils 172. Moreover, in an embodiment, as shown in FIG. 8, the coils 172 may be stacked into a plurality of layers (with FIG. 8 illustrating the coils 197 stacked into two layers). In such embodiments, the reinforcement material itself (i.e., the rebar) may have a relatively small diameter, e.g., of less than about 20 millimeters.

Figure 9:
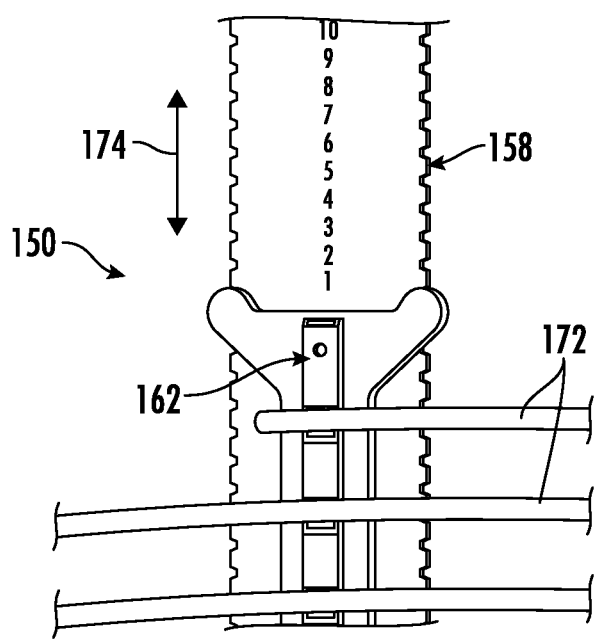
FIG. 9 illustrates a partial, top view of the apparatus for manufacturing the continuous reinforcement ring member for the tower structure of FIG. 8.
Figure 10:
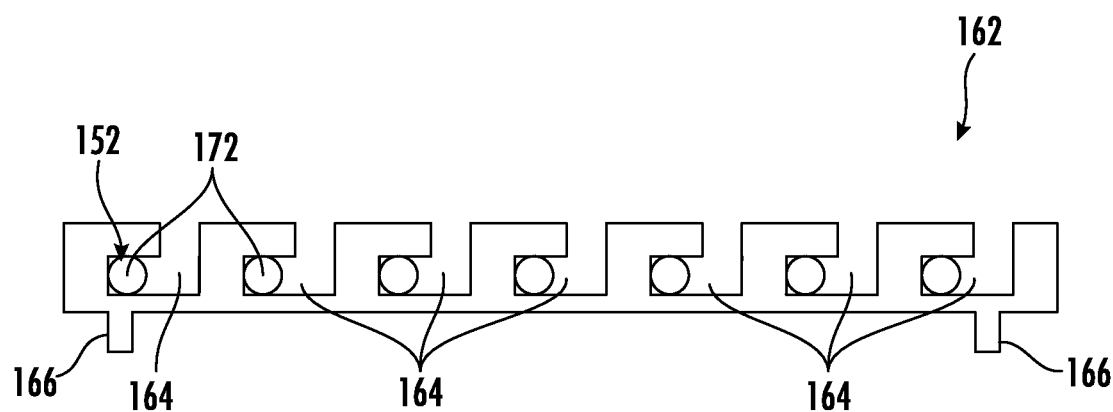
FIG. 10 illustrates a side view of an embodiment of a locating guide of an apparatus for manufacturing a continuous reinforcement ring member for a tower structure according to the present disclosure.

In particular, as shown in FIGS. 7A-13, the locating guides 162 are configured to receive and secure the plurality of coils 172 of the continuous reinforcement ring member 170 therein. More specifically, FIG. 10 illustrates a front view of an embodiment of one of the location guides 162 according to the present disclosure. As shown, in an embodiment, the locating guide(s) 162 may include one or more radially spaced retention features 164 for receiving and securing one or more of the plurality of coils 172 of the continuous reinforcement ring member 170 therein. More specifically, as shown, the locating guide(s) 162 may include a plurality of radially spaced retention features 164, such as seven (7) radially spaced retention features 164. In further embodiments, the locating guide(s) 162 may include any number of the radially spaced retention features 164, such as more than seven radially spaced retention features 164 or less than seven radially spaced retention features 164. Moreover, in an embodiment, the radially spaced retention features 164 may be any of slots, fasteners, grooves, protrusions, hooks, non-slip surfaces, or combinations thereof and may have any suitable shape so as to constrain the coils 172 in a desired shape. For example, in an embodiment, as shown in FIG. 6, the radially spaced retention features 164 are slots having a generally L-shaped configuration.

In additional embodiments, and still referring to FIG. 6, the locating guide(s) 162 may include one or more positioning pins 166. In such embodiments, as shown in FIG. 7A, the arm members 158 may also include one or more corresponding holes 168 for receiving the positioning pin(s) 166. Thus, the locating guide(s) 162 can be moved and secured at any radial location along the arm member(s) 158. In further embodiments, as shown in FIGS. 8 and 9, the locating guide(s) 162 may be slidable (as indicated via arrow 174) along one of the arm members 158 to set a desired radial location of the locating guide(s) 162. Moreover, as shown, the arm member(s) 158 may include various markers 176 (e.g., rulers) to indicate a location (e.g., a diameter) of the continuous reinforcement ring member 170. Accordingly, the assembly 150 can be modified to form the continuous reinforcement ring member 170 with any desired diameter to correspond with any size diameter of the structure. As such, the assembly 150 can be used to form reinforcement ring members of any size that can be used in any sized structure, such as tower structure 12.

Figure 18A:
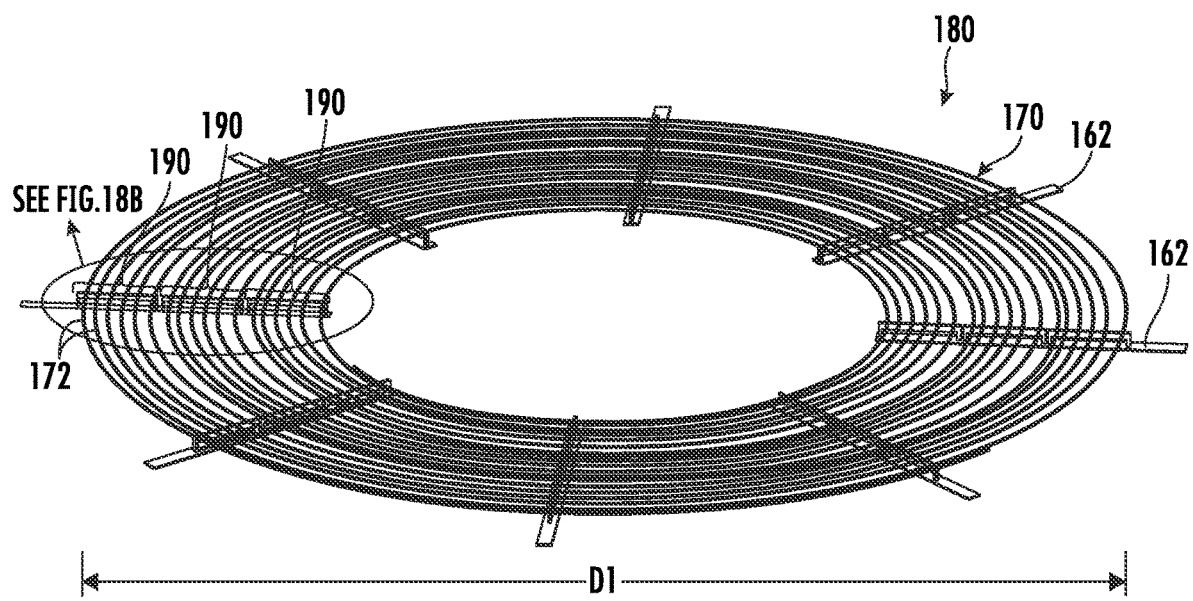
FIGS. 18A and 18B illustrate isometric views of an embodiment of a reinforcement assembly for a tower structure according to the present disclosure, particularly illustrating the reinforcement assembly being used to form multiple ring members on a fixture at the same time.
Figure 18B:
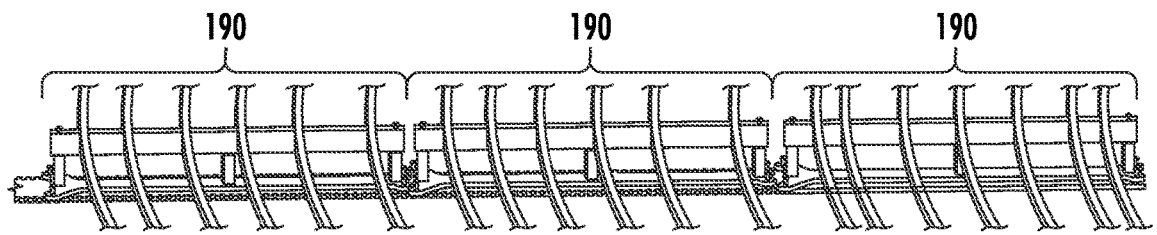
Figure 19:
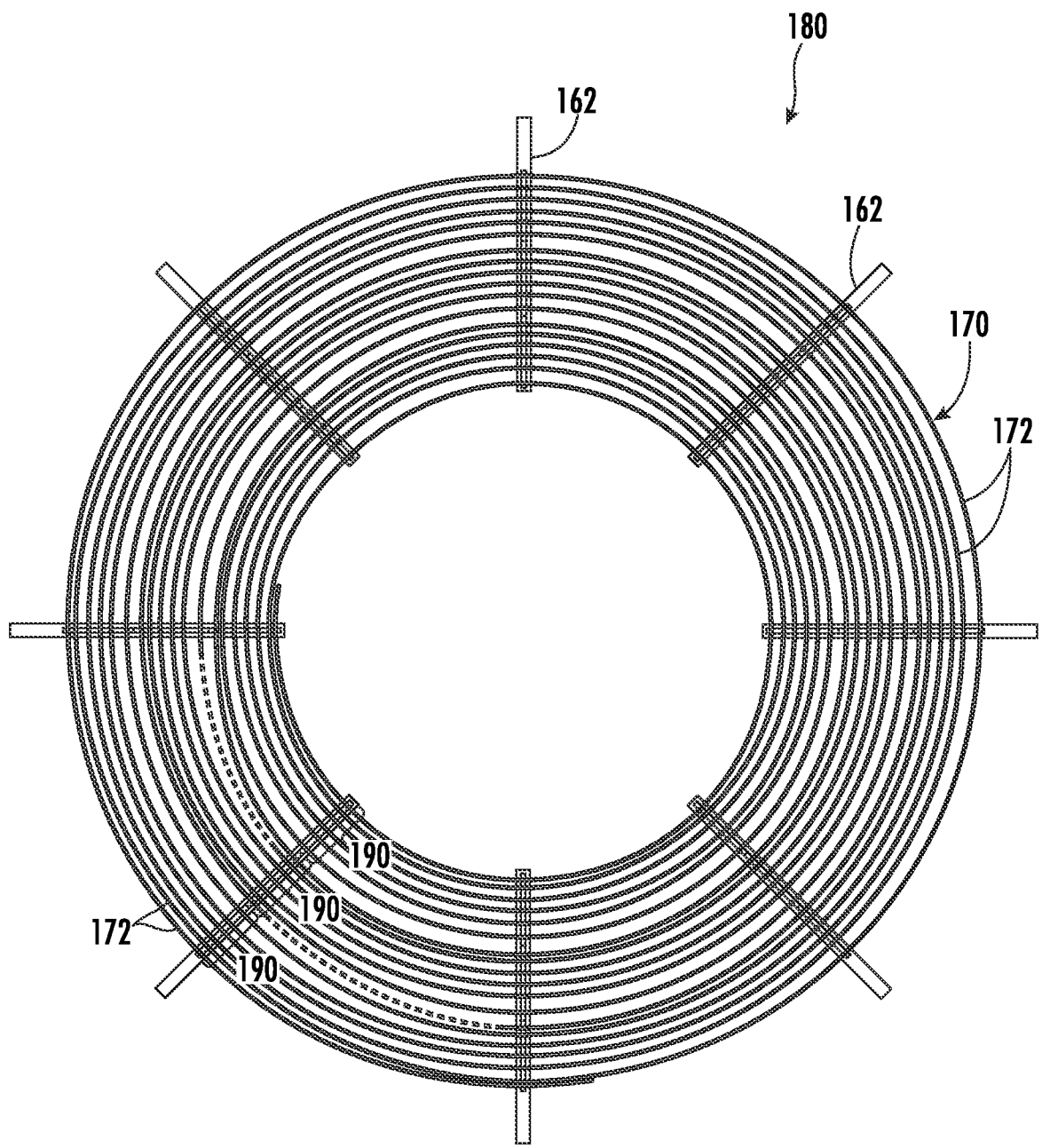
FIG. 19 illustrates an isometric view of another embodiment of a reinforcement assembly for a tower structure according to the present disclosure.

Referring now to FIGS. 11-19, various views of embodiments of a reinforcement assembly 180 for a structure, such as tower structure 12, are illustrated. In particular, as generally shown, the reinforcement assembly 180 includes the continuous reinforcement ring member 170 constructed of the plurality of coils 172 of reinforcement material. Furthermore, as shown in FIGS. 19, the reinforcement assembly 180 includes a plurality of the locating guides 162 circumferentially spaced around and secured to the continuous reinforcement ring member 170. As such, the locating guides 162 are configured to receive and secure the plurality of coils 172 of the continuous reinforcement ring 170 member therein.

Figure 11:
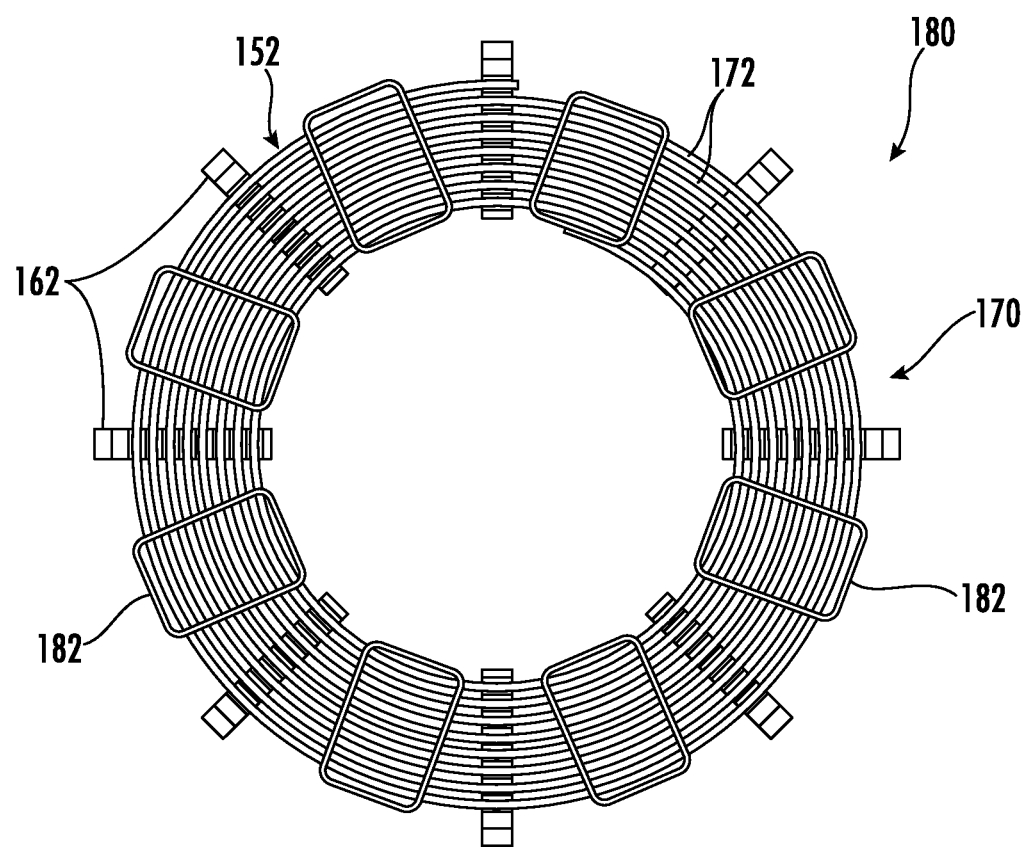
FIG. 11 illustrates a top view of an embodiment of a reinforcement assembly for a tower structure according to the present disclosure.
Figure 13:
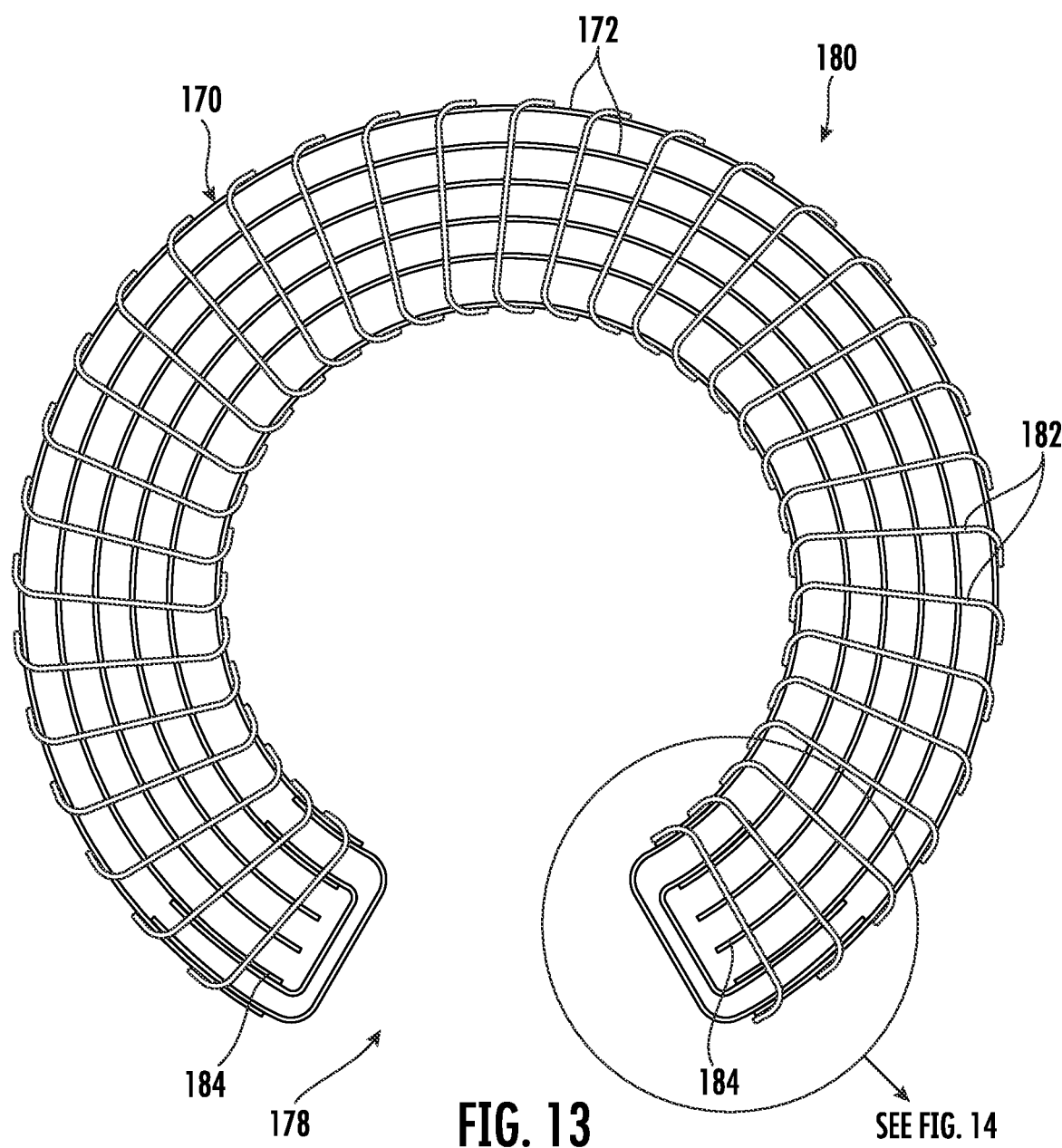
FIG. 13 illustrates a partial, perspective view of an embodiment of a reinforcement assembly for a tower structure according to the present disclosure.
Figure 15:
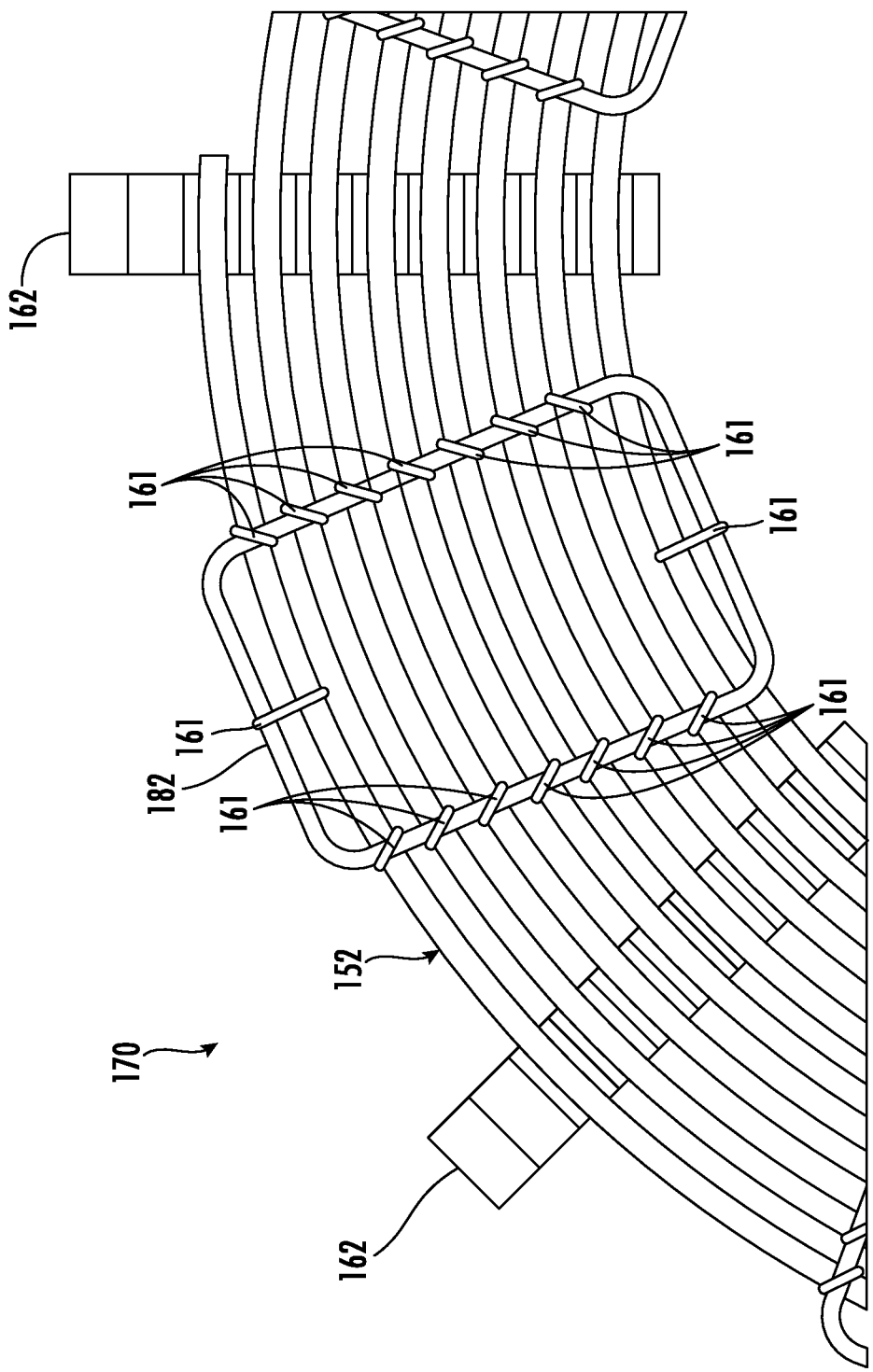
FIG. 15 illustrates a partial, detailed view of the reinforcement assembly of FIG. 11 according to the present disclosure.
Figure 16:
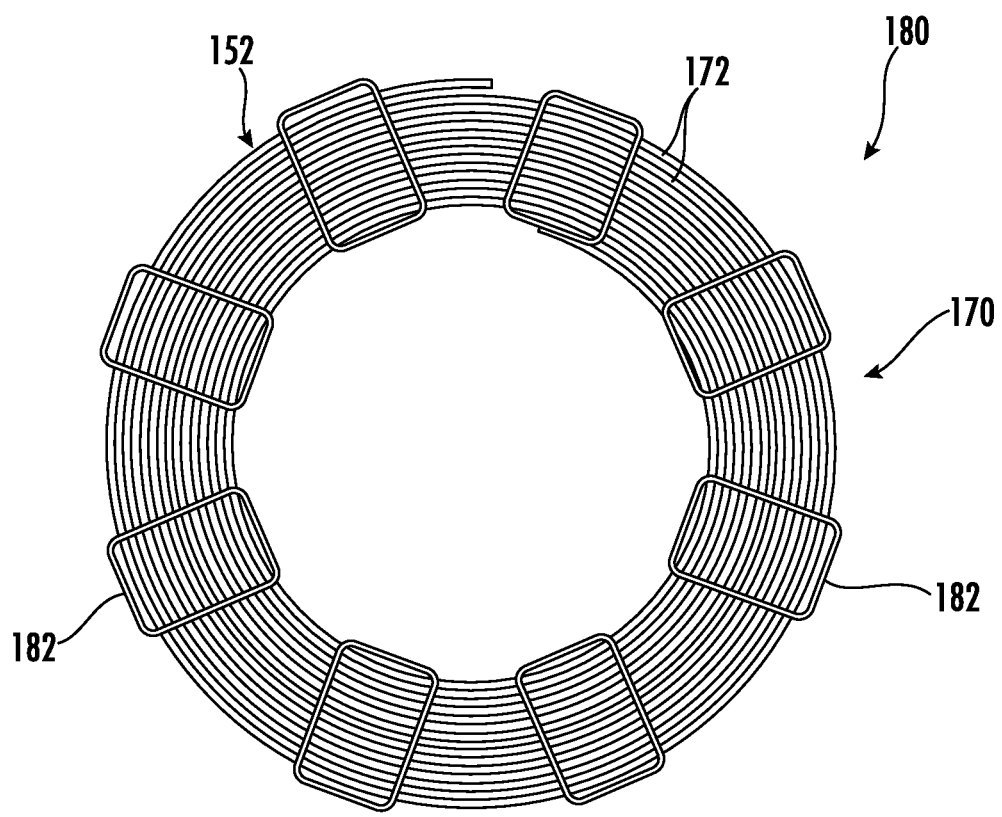
FIG. 16 illustrates a top view of still another embodiment of a reinforcement assembly for a tower structure according to the present disclosure.
Figure 17:
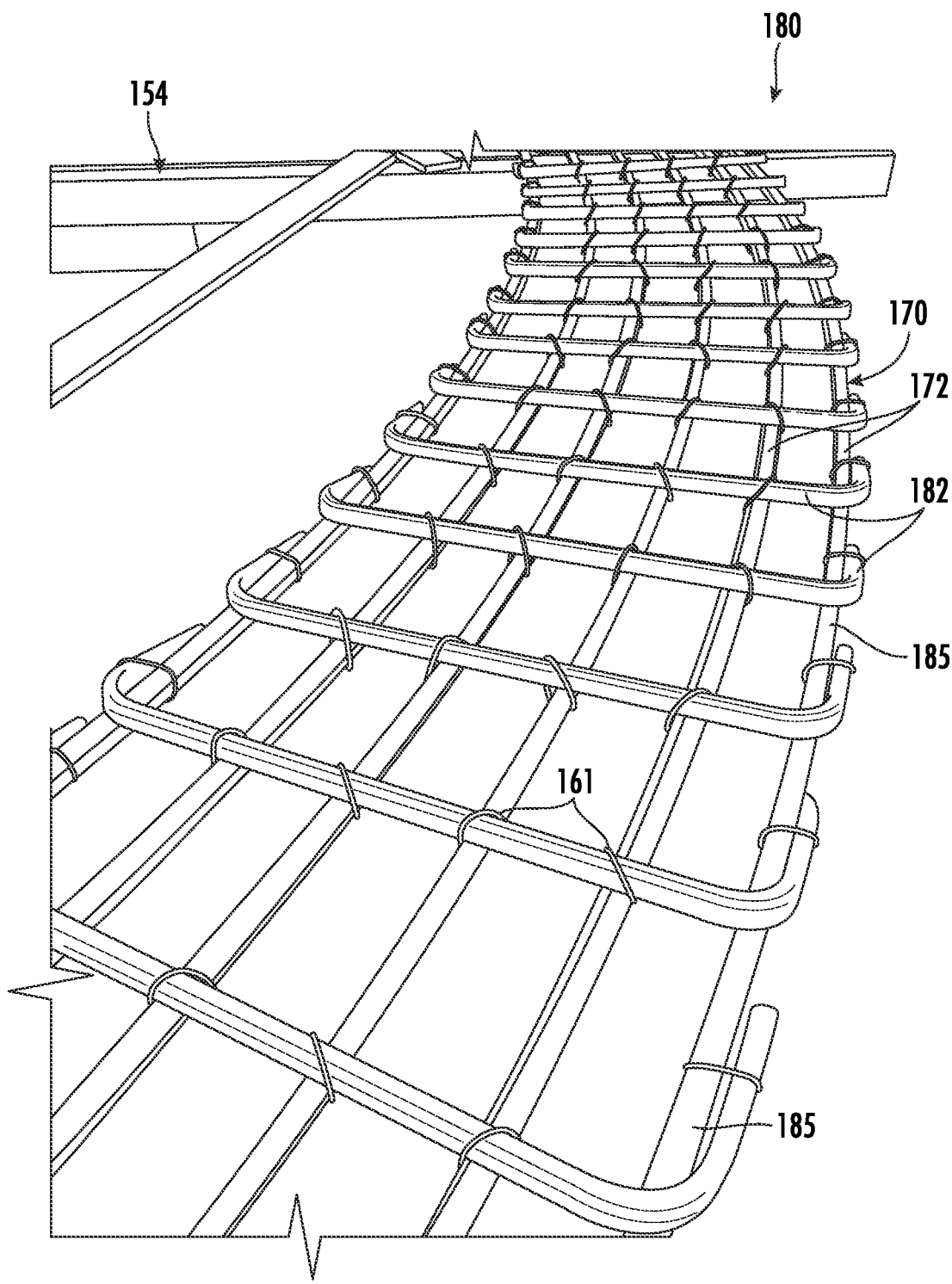
FIG. 17 illustrates a partial, perspective view of an embodiment of an assembly for reinforcing a tower structure according to the present disclosure.

In addition, as shown, the reinforcement assembly 180 includes a plurality of supports 182 for further reinforcing the continuous reinforcement ring member 170. In an embodiment, as shown in FIGS. 11 and 15, for example, each of the supports 182 may have a box-shaped configuration. In further embodiments, the supports 182 may have any suitable shape and/or size. For example, as shown in FIGS. 13 and 17, the supports 182 may have an open-loop configuration, such as a C-shaped configuration. In particular embodiments, as shown in FIGS. 13 and 17, ends of the C-shaped supports 182 extend over outside edges 185 of outer and inner circumferential coils 172. In such embodiments, the C-shaped supports 182 are configured to increase the load bearing capability of the tower section and reduce burst out potential of the continuous reinforcement ring 170. Also, the C-shaped supports 182 allow the stack up height of continuous reinforcement ring 170 to be minimized such that continuous reinforcement ring 170 is less than a height of a corresponding printed concrete layer.

Moreover, as shown, the plurality of supports 182 may be circumferentially spaced around and secured to the continuous reinforcement ring member 170. For example, as shown in FIGS. 15 and 17, the plurality of supports 182 may be secured to the continuous reinforcement ring member 170 via one or more ties 161, such as a wire tie, wrap, loop, or similar. In particular embodiments, as shown in FIGS. 11 and 15, the plurality of locating guides 162 and the plurality of supports 182 may be arranged circumferentially around the continuous reinforcement ring member 170 in an alternating pattern.

Figure 12:
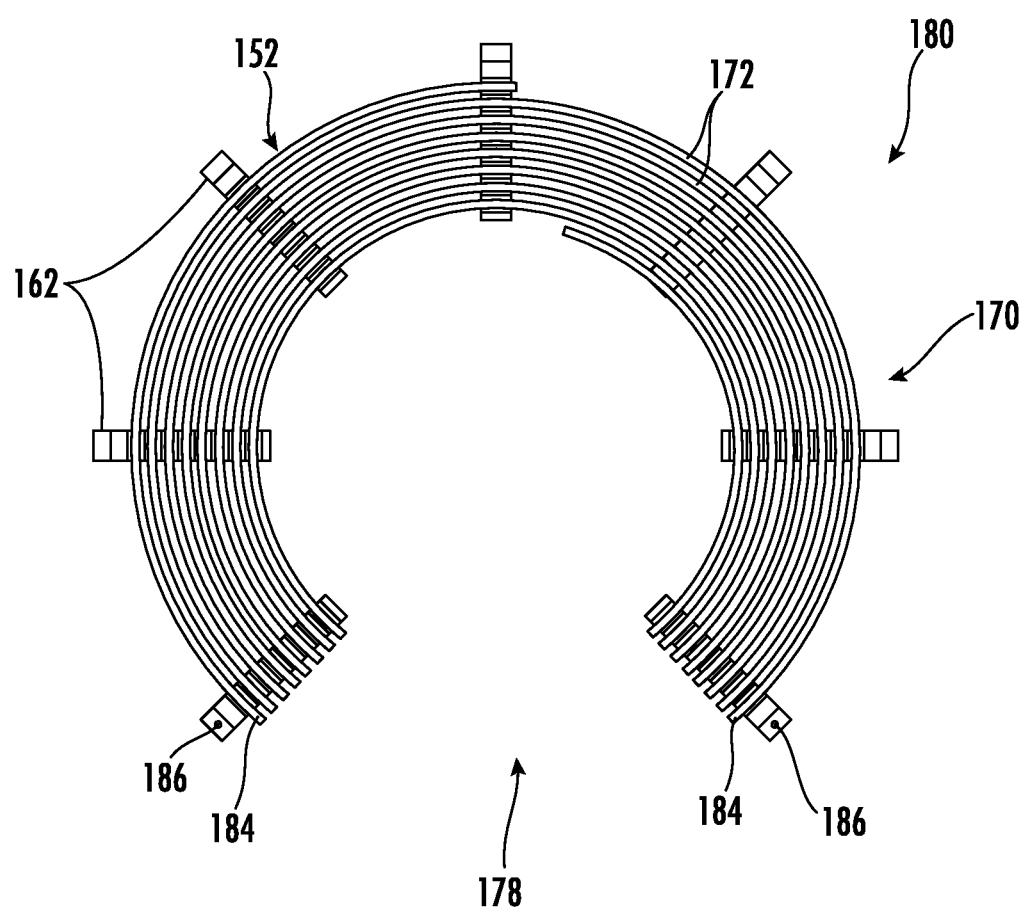
FIG. 12 illustrates a top view of another embodiment of a reinforcement assembly for a tower structure according to the present disclosure.
Figure 14:
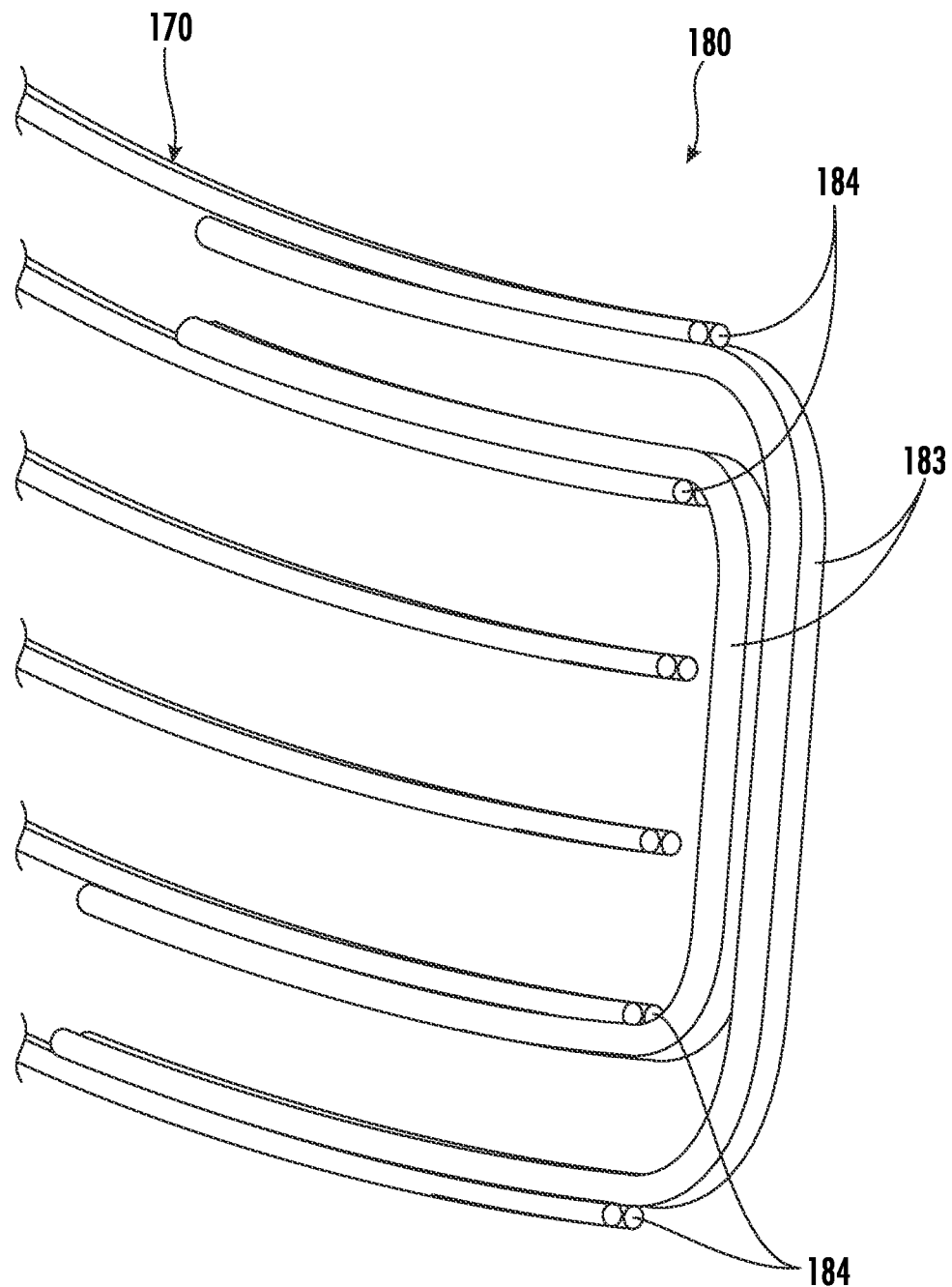
FIG. 14 illustrates a partial, perspective view of another embodiment of a reinforcement assembly for a tower structure according to the present disclosure.

Referring now to FIGS. 12-14, various views of another embodiment of a reinforcement assembly 180 for a structure, such as tower structure 12, is illustrated. In particular, as shown, the reinforcement assembly 180 includes the continuous reinforcement ring member 170 constructed of the plurality of coils 172 of reinforcement material. Furthermore, as shown in FIG. 12, the reinforcement assembly 180 includes a plurality of the locating guides 162 circumferentially spaced around and secured to the continuous reinforcement ring member 170. As such, the locating guides 162 are configured to receive and secure the plurality of coils 172 of the continuous reinforcement ring 170 member therein. In contrast to the embodiment of FIG. 11, however, the reinforcement assembly 180 of FIGS. 12-14 include an opening 178. In such embodiments, for example, the opening 178 can be formed into the continuous reinforcement ring member 170 to allow for a door of the tower structure 12 to be arranged therein, e.g., when printing the tower structure 12. More specifically, in an embodiment, in the area of the tower door (or any other area where less reinforcement material is desired), the continuous reinforcement ring member 170 may be initially constructed of full ring coils 172 as described herein.

After the continuous reinforcement ring member 170 is formed, e.g., of Elium®, the ring member 170 may be heated above its glass transition temperature to relieve any built in stress if needed. Once the stress is relieved, the opening 178 can be formed by cutting away the desired section. In such embodiments, as shown in FIGS. 12-14, additional securement of the cut ends 184 may be required. Thus, as shown, the cut ends 184 may be further secured via one or more fasteners 186 to hold the coils/rings 172 in place. In other embodiments, as shown in FIGS. 13 and 14, one or more support members 183 may be secured to the cut ends 184 of the continuous reinforcement ring member 170 to provide support to the outer and inner perimeter coils 172 to prevent burst-out of the outer and inner most circumferential coils 172. In particular, as shown, the support members 183 may have a U-shaped configuration.

In alternative embodiments, in the area of the tower door (or any other area where less reinforcement material is desired), the continuous reinforcement ring member 170 may be constructed of full ring coils 172 as described herein and placed in the tower structure 12 as the layers are printed. After casting and solidification of the tower structure 12, excess material (e.g., both cementitious material and reinforcement material) in the doorway may be removed (e.g., cut away). In such embodiments, the removed material can be recycled and/or discarded.

In further embodiments, a total stacked height of the continuous reinforcement ring member 170 may be less than a printed layer thickness of the cementitious material. In another embodiment, a diameter of the continuous reinforcement ring member 170 may be selected for use which is based on the modulus (stiffness of the material) to enable the delivery of large amounts of the pultruded polymer material on a continuous coil, whereas that coil outer diameter is small enough to be readily transportable by conventional trucking services and is small enough to be delivered without extreme oversize permits. Thus, in an embodiment, the continuous reinforcement ring member 170 may be coiled to a much smaller diameter that does not result in rupture or significant permanent deformation of the pultruded polymer material as a result of this tight radius coiling. As an example, for 60 MPa pultruded polyester rebar, a maximum diameter of about ⅝" may be selected, with a preferred diameter of ½ " or less.

Referring now to FIGS. 18A, 18B, and 19, isometric views of another embodiment of forming the continuous reinforcement ring member 170 according to the present disclosure is illustrated. In particular, as shown, the continuous reinforcement ring member 170 may be formed by initially forming the continuous reinforcement ring member 170 of a certain, larger diameter $D_1$ that allows for multiple ring members 190 to be formed therefrom. In particular, as shown in FIG. 18, the larger continuous reinforcement ring member of FIG. 18A may be cut to form the individual ring members 190.

Figure 21:
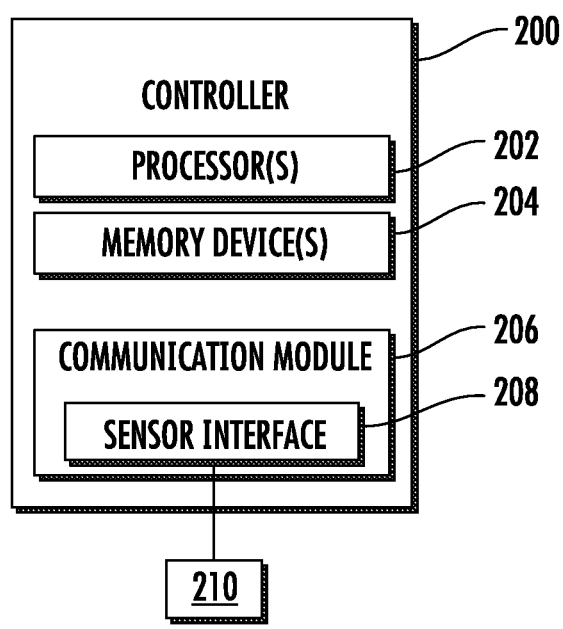
FIG. 21 illustrates a block diagram of an embodiment of a controller of an additive printing system according to the present disclosure.

Referring now to FIG. 21, a schematic diagram of an embodiment of suitable components of the controller 200 that may control the additive printing system 40 and/or the assembly 150 described herein according to the present disclosure is illustrated. For example, as shown, the controller 200 may include one or more processor(s) 202 and associated memory device(s) 204 configured to perform a variety of computer-implemented functions (e.g., performing the methods, steps, calculations and the like and storing relevant data as disclosed herein). Additionally, the controller 200 may also include a communications module 206 to facilitate communications between the controller 200 and the various components of the additive printing system 40. Further, the communications module 206 may include a sensor interface 208 (e.g., one or more analog-to-digital converters) to permit signals transmitted from one or more sensors to be converted into signals that can be understood and processed by the processors 202. It should be appreciated that the sensor(s) may be communicatively coupled to the communications module 206 using any suitable means, such as a wired or a wireless connection. Additionally, the communications module 206 may also be operably coupled to a component of the additive printing system 40 so as to orchestrate the formation of the tower structure 12.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 204 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 204 may generally be configured to store suitable computer-readable instructions that, when implemented by the processor(s) 202, configure the controller 200 to perform various functions including, but not limited to, manufacturing a tower structure, as described herein, as well as various other suitable computer-implemented functions.

Further aspects of the present disclosure are provided by the subject matter of the following clauses:

A method of manufacturing a tower structure, the method comprising: printing and depositing, via a printhead assembly of an additive printing system, one or more printed layers of a wall of the tower structure; unwinding at least one continuous roll of a reinforcement material to form at least one continuous reinforcement ring member layer, the reinforcement material comprising a pultruded polymer material; placing the at least one continuous reinforcement ring member layer atop the one or more printed layers of the wall of the tower structure; and printing and depositing, via the printhead assembly of the additive printing system, one or more additional printed layers of the wall of the tower structure atop the at least one continuous reinforcement ring member layer.

The method of any preceding clause, wherein unwinding the at least one continuous roll of the reinforcement material to form the at least one continuous reinforcement ring member layer further comprises: securing a portion of the at least one continuous roll of the reinforcement material to a fixture; and rotating the fixture about a central axis to unwind the at least one continuous roll of the reinforcement material to form the at least one continuous reinforcement ring member layer.

The method of any preceding clause, wherein the at least one continuous reinforcement ring member layer comprises one or more coils.

The method of any preceding clause, wherein the fixture comprises a plurality of arm members extending radially from the central axis, each arm member of the plurality of arm members comprising a locating guide for receiving and securing the one or more coils of the at least one continuous reinforcement ring member layer.

The method of any preceding clause, further comprising setting a position of the locating guides on one of the arm members by at least one of: securing positioning pins of the locating guides into corresponding holes on one of the arm members; or sliding the locating guides along one of the arm members to a desired radial location and securing the locating guides on one of the arm members at the desired radial location, wherein setting the position of the locating guides on at least one of the arm members sets a desired dimension of the at least one continuous reinforcement ring member layer to correspond with a dimension of the tower structure.

The method of any preceding clause, wherein the locating guides comprise a plurality of radially spaced retention features for receiving and securing one or more of the one or more coils of the at least one continuous reinforcement ring member layer therein.

The method of any preceding clause, wherein the radially spaced retention features comprise at least one of slots, fasteners, grooves, protrusions, hooks, non-slip surfaces, or combinations thereof.

The method of any preceding clause, further comprising: removing a portion of the at least one continuous reinforcement ring member layer to form an opening therein; and placing the at least one continuous reinforcement ring member layer atop the one or more printed layers of the wall of the tower structure.

The method of any preceding clause, wherein the opening is positioned at a location of a door of the tower structure.

The method of any preceding clause, further comprising heating the at least one continuous reinforcement ring member layer above its glass transition temperature to relieve built in stress before placing the at least one continuous reinforcement ring member layer atop the one or more printed layers of the wall of the tower structure with the opening being positioned at the location of the door of the tower structure.

The method of any preceding clause, further comprising removing the at least one continuous reinforcement ring member layer from the fixture and subsequently placing the at least one continuous reinforcement ring member layer atop the one or more printed layers of the wall of the tower structure.

The method of any preceding clause, further comprising securing a plurality of supports to the at least one continuous reinforcement ring member layer before placing the at least one continuous reinforcement ring member layer atop the one or more printed layers of the wall of the tower structure.

The method of any preceding clause, wherein the locating guides remain in place after removing the at least one continuous reinforcement ring member layer from the fixture to maintain positioning of the one or more coils.

The method of any preceding clause, further comprising:
forming the at least one continuous reinforcement ring member layer of a certain diameter that allows for multiple ring members to be formed therefrom; and
cutting the at least one continuous reinforcement ring member layer to form a plurality of individual ring members.

An assembly for manufacturing at least one continuous reinforcement ring member layer for reinforcing a structure, the assembly comprising: one or more continuous rolls of a reinforcement material, the reinforcement material comprising a pultruded polymer material; a fixture secured to a portion of the one or more continuous rolls of the reinforcement material, the fixture comprising a plurality of arm members extending radially from the central axis, each arm member of the plurality of arm members comprising a locating guide secured thereto, wherein the fixture is rotatable about a central axis to unwind the one or more continuous rolls of the reinforcement material to form the at least one continuous reinforcement ring member layer comprising one or more coils, and wherein the locating guides are configured to receive and secure the one or more coils of the at least one continuous reinforcement ring member layer therein.

The assembly of any preceding clause, wherein the plurality of locating guides comprise one or more positioning pins and the plurality of arm members comprise one or more corresponding holes for receiving the one or more positioning pins for setting a position of a respective locating guide on one of the arm members, thereby providing a desired dimension of the at least one continuous reinforcement ring member layer to correspond with a dimension of the structure.

The assembly of any preceding clause, wherein the plurality of locating guides are slidable along one of the arm members to set a desired radial location of the locating guides.

The assembly of any preceding clause, wherein the plurality of locating guides comprise a plurality of radially spaced retention features for receiving and securing one or more of the one or more coils of the at least one continuous reinforcement ring member layer therein.

The assembly of any preceding clause, wherein the plurality of supports have at least one of an open loop configuration, a rod-shaped configuration, a closed loop configuration, or combinations thereof.

A reinforcement assembly for a structure, the reinforcement assembly comprising: at least one continuous reinforcement ring member layer constructed of a plurality of coils of reinforcement material stacked into a plurality of layers, the reinforcement material comprising a fiber-reinforced pultruded polymer material, the reinforcement material having a diameter of less than about 20 millimeters; and a plurality of supports circumferentially spaced around and secured to the at least one continuous reinforcement ring member layer.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of manufacturing a tower structure, the method comprising:
   printing and depositing, via a printhead assembly of an additive printing system, one or more printed layers of a wall of the tower structure;
   securing a portion of at least one continuous roll of a reinforcement material to a fixture;
   rotating the fixture about a central axis to unwind the at least one continuous roll of the reinforcement material to form the at least one continuous reinforcement ring member layer, the reinforcement material comprising a pultruded polymer material, the at least one continuous reinforcement ring member layer comprises one or more coils, the fixture comprising a plurality of arm members extending radially from the central axis, each arm member of the plurality of arm members comprising a locating guide for receiving and securing the one or more coils of the at least one continuous reinforcement ring member layer therein;
   placing the at least one continuous reinforcement ring member layer atop the one or more printed layers of the wall of the tower structure; and
   printing and depositing, via the printhead assembly of the additive printing system, one or more additional printed layers of the wall of the tower structure atop the at least one continuous reinforcement ring member layer.

2. The method of claim 1, further comprising setting a position of the locating guides on one of the arm members by at least one of:
   securing positioning pins of the locating guides into corresponding holes on one of the arm members; or
   sliding the locating guides along one of the arm members to a desired radial location and securing the locating guides on one of the arm members at the desired radial location,
   wherein setting the position of the locating guides on at least one of the arm members sets a desired dimension of the at least one continuous reinforcement ring member layer to correspond with a dimension of the tower structure.

3. The method of claim 1, wherein the locating guides comprise a plurality of radially spaced retention features for receiving and securing one or more of the one or more coils of the at least one continuous reinforcement ring member layer therein.

4. The method of claim 3, wherein the radially spaced retention features comprise at least one of slots, fasteners, grooves, protrusions, hooks, non-slip surfaces, or combinations thereof.

5. The method of claim 1, further comprising:
   removing a portion of the at least one continuous reinforcement ring member layer to form an opening therein; and
   placing the at least one continuous reinforcement ring member layer atop the one or more printed layers of the wall of the tower structure.

6. The method of claim 2, wherein the opening is positioned at a location of a door of the tower structure.

7. The method of claim 6, further comprising heating the at least one continuous reinforcement ring member layer above its glass transition temperature to relieve built in stress before placing the at least one continuous reinforcement ring member layer atop the one or more printed layers of the wall of the tower structure with the opening being positioned at the location of the door of the tower structure.

8. The method of claim 1, further comprising removing the at least one continuous reinforcement ring member layer from the fixture and subsequently placing the at least one continuous reinforcement ring member layer atop the one or more printed layers of the wall of the tower structure.

9. The method of claim 8, further comprising securing a plurality of supports to the at least one continuous reinforcement ring member layer before placing the at least one continuous reinforcement ring member layer atop the one or more printed layers of the wall of the tower structure.

10. The method of claim 8, wherein the locating guides remain in place after removing the at least one continuous reinforcement ring member layer from the fixture to maintain positioning of the one or more coils.

11. The method of claim 1, further comprising:
   forming the at least one continuous reinforcement ring member layer of a certain diameter that allows for multiple ring members to be formed therefrom; and
   cutting the at least one continuous reinforcement ring member layer to form a plurality of individual ring members.

12. An assembly for manufacturing at least one continuous reinforcement ring member layer for reinforcing a structure, the assembly comprising:
one or more continuous rolls of a reinforcement material, the reinforcement material comprising a pultruded polymer material; and
a fixture secured to a portion of the one or more continuous rolls of the reinforcement material, the fixture comprising a plurality of arm members extending radially from a central axis, each arm member of the plurality of arm members comprising a locating guide secured thereto,
wherein the fixture is rotatable about a central axis to unwind the one or more continuous rolls of the reinforcement material to form the at least one continuous reinforcement ring member layer comprising one or more coils, and
wherein the locating guides are configured to receive and secure the one or more coils of the at least one continuous reinforcement ring member layer therein.

13. The assembly of claim 12, wherein the plurality of locating guides comprise one or more positioning pins and the plurality of arm members comprise one or more corresponding holes for receiving the one or more positioning pins for setting a position of a respective locating guide on one of the arm members, thereby providing a desired dimension of the at least one continuous reinforcement ring member layer to correspond with a dimension of the structure.

14. The assembly of claim 13, wherein the plurality of supports have at least one of an open loop configuration, a rod-shaped configuration, a closed loop configuration, or combinations thereof.

15. The assembly of claim 12, wherein the plurality of locating guides are slidable along one of the arm members to set a desired radial location of the locating guides.

16. The assembly of claim 12, wherein the plurality of locating guides comprise a plurality of radially spaced retention features for receiving and securing one or more of the one or more coils of the at least one continuous reinforcement ring member layer therein.

* * * * *